(12) United States Patent
Nishibata

(10) Patent No.: US 11,387,766 B2
(45) Date of Patent: Jul. 12, 2022

(54) CONTROL CIRCUIT FOR ELECTRIC POWER CONVERTER

(71) Applicant: DENSO CORPORATION, Kariya (JP)

(72) Inventor: Koichi Nishibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 16/395,323

(22) Filed: Apr. 26, 2019

(65) Prior Publication Data

US 2019/0341871 A1    Nov. 7, 2019

(30) Foreign Application Priority Data

May 7, 2018    (JP) .............................. JP2018-089494

(51) Int. Cl.
| | |
|---|---|
| *H02P 29/024* | (2016.01) |
| *H02P 27/06* | (2006.01) |
| *H02M 1/08* | (2006.01) |
| *H02M 7/5387* | (2007.01) |
| *H02M 1/00* | (2006.01) |

(52) U.S. Cl.
CPC .......... *H02P 29/0241* (2016.02); *H02M 1/08* (2013.01); *H02M 7/53871* (2013.01); *H02P 27/06* (2013.01); *H02M 1/0009* (2021.05)

(58) Field of Classification Search
CPC ...... H02P 29/0241; H02P 27/06; H02M 1/08; H02M 7/53871; H02M 1/0009
See application file for complete search history.

(56) References Cited

U.S. PATENT DOCUMENTS

| | | | |
|---|---|---|---|
| 2009/0066286 A1* | 3/2009 | Gunji .................. | B62D 5/0487 318/490 |
| 2012/0050922 A1* | 3/2012 | Yamai .................. | H02P 29/032 361/31 |
| 2012/0292985 A1* | 11/2012 | Sakai ..................... | B60L 1/003 307/9.1 |
| 2015/0162816 A1* | 6/2015 | Herrmann .......... | H02M 5/4505 307/35 |

(Continued)

FOREIGN PATENT DOCUMENTS

| | | |
|---|---|---|
| JP | 2016-013040 A | 1/2016 |
| WO | 2016/104318 A1 | 6/2016 |

*Primary Examiner* — Kawing Chan
(74) *Attorney, Agent, or Firm* — Oliff PLC

(57) ABSTRACT

A control circuit for an electric power converter includes an abnormality determiner, a voltage determiner and an abnormality-handling controller. The abnormality determiner determines whether an abnormality has occurred in at least one of the electric power converter and a multi-phase rotating electric machine. The voltage determiner determines whether a line-to-line voltage between phase windings of the rotating electric machine is higher than a voltage of a DC power source. The abnormality-handling controller performs, when it is determined by the abnormality determiner that an abnormality has occurred and it is determined by the voltage determiner that the line-to-line voltage is higher than the voltage of the DC power source, an all-phase short circuit control of turning on all of switches of one of an upper-arm switch group and a lower-arm switch group and turning off all of switches of the other of the upper-arm switch group and the lower-arm switch group.

10 Claims, 20 Drawing Sheets

(56) References Cited

U.S. PATENT DOCUMENTS

| | | | |
|---|---|---|---|
| 2015/0280624 A1* | 10/2015 | Sotome | H02M 7/5387 |
| | | | 318/400.22 |
| 2017/0158057 A1* | 6/2017 | Otani | B60L 3/00 |
| 2017/0331400 A1 | 11/2017 | Saha et al. | |
| 2018/0178833 A1* | 6/2018 | Terdy | B62D 5/0409 |
| 2018/0316259 A1* | 11/2018 | Tsujii | H02M 3/158 |
| 2018/0375321 A1* | 12/2018 | Ehrhart | H02H 7/0838 |

\* cited by examiner

CONTROL CIRCUIT FOR ELECTRIC POWER CONVERTER

CROSS-REFERENCE TO RELATED APPLICATION

This application is based on and claims priority from Japanese Patent Application No. 2018-89494 filed on May 7, 2018, the contents of which are hereby incorporated by reference in their entirety into this application.

BACKGROUND

1 Technical Field

The present disclosure relates to control circuits for electric power converters.

2 Description of Related Art

There are known control circuits for electric power converters that have, for each of phase windings of a multi-phase rotating electric machine, upper-arm and lower-arm switches electrically connected to the phase winding. These control circuits are configured to forcibly turn off all of the upper-arm and lower-arm switches of the electric power converter upon determination that an abnormality has occurred in at least one of the electric power converter and the rotating electric machine.

SUMMARY

According to the present disclosure, there is provided a control circuit for an electric power converter. The electric power converter includes a plurality of switch pairs each consisting of an upper-arm switch and a lower-arm switch that are electrically connected in series with each other. Each of the switch pairs has a corresponding one of a plurality of phase windings of a multi-phase rotating electric machine electrically connected to a node between the upper-arm and lower-arm switches of the switch pair. Each of the upper-arm and lower-arm switches has a diode electrically connected in antiparallel thereto. The switch pairs have a DC power source electrically connected in parallel thereto. All of the upper-arm switches of the switch pairs together constitute an upper-arm switch group and all of the lower-arm switches of the switch pairs together constitute a lower-arm switch group. The control circuit includes an abnormality determiner, a voltage determiner and an abnormality-handling controller. The abnormality determiner is configured to determine whether an abnormality has occurred in at least one of the electric power converter and the rotating electric machine. The voltage determiner is configured to determine whether a line-to-line voltage between the phase windings of the rotating electric machine when a counterelectromotive force is generated in the phase windings is higher than a voltage of the DC power source. The abnormality-handling controller is configured to perform, when it is determined by the abnormality determiner that an abnormality has occurred in at least one of the electric power converter and the rotating electric machine and it is determined by the voltage determiner that the line-to-line voltage is higher than the voltage of the DC power source, an all-phase short circuit control of turning on all of the switches of one of the upper-arm switch group and the lower-arm switch group and turning off all of the switches of the other of the upper-arm switch group and the lower-arm switch group.

DESCRIPTION OF EMBODIMENTS

Figure 1:
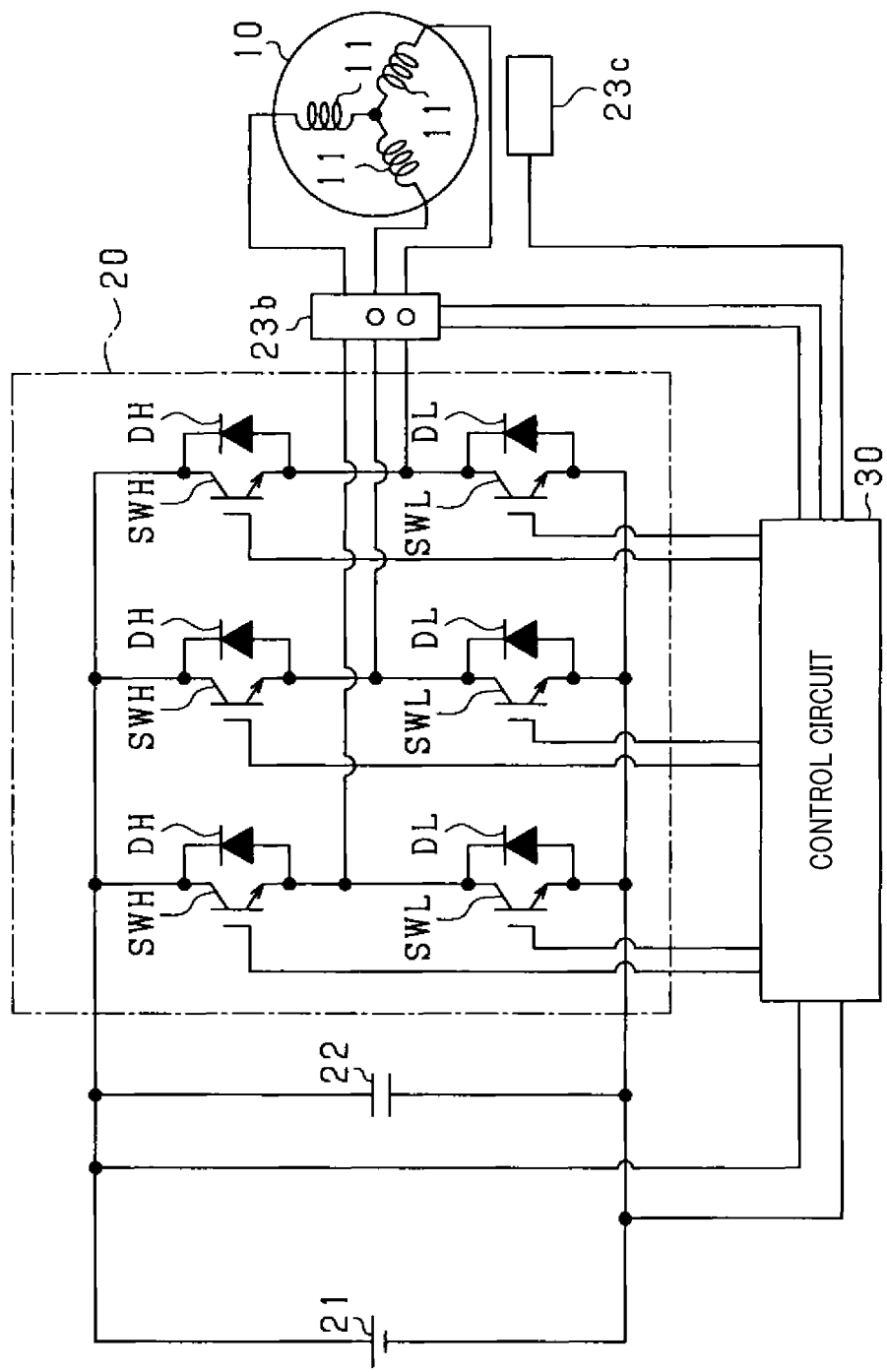
FIG. 1 is a schematic diagram illustrating the overall configuration of a rotating electric machine control system which includes a control circuit according to a first embodiment.

There is known, for example from Japanese Patent Application Publication No. JP2016013040A, a control circuit for an electric power converter which performs, upon determination that an abnormality has occurred in a current sensor, a shutdown control of forcibly turning off all of the upper-arm and lower-arm switches of the electric power converter; the current sensor is configured to detect electric current flowing in each of the phase windings of the rotating electric machine.

However, the inventor of the present application has found the following problems with the known control circuit.

The rotational speed of a rotor of the rotating electric machine may be high when the shutdown control is performed by the known control circuit; thus, when a counter-electromotive force is generated in the phase windings of the rotating electric machine, the line-to-line voltage between the phase windings may become higher than the voltage of a DC power source. The DC power source is electrically connected in parallel to switch pairs each consisting of one upper-arm switch and one lower-arm switch that are electrically connected in series with each other. In this case, though all of the upper-arm and lower-arm switches are turned off, so-called regeneration is performed such that electric current induced in the phase windings of the rotating electric machine flows through a closed circuit that includes the phase windings, the DC power source and diodes each being connected in antiparallel to one of the upper-arm and lower-arm switches. Consequently, the DC voltage on the DC power source side of the electric power converter rises considerably; thus reliability degradation or a failure may occur in at least one of the DC power source, components of the electric power converter (e.g., the switches and a smoothing capacitor) and other electrical machines and devices connected with the DC power source.

In contrast, the above-described control circuit according to the present disclosure has the following advantages.

When the all-phase short circuit control is performed, no closed circuit is formed which includes the diodes, the phase windings of the rotating electric machine and the DC power source. Instead, a closed circuit is formed which includes the turned-on switches of the electric power converter and the phase windings of the rotating electric machine. Consequently, it becomes possible to cause electric current induced in the phase windings of the rotating electric machine to flow within the formed closed circuit, thereby preventing regeneration from being performed. As a result, it becomes possible to prevent the DC voltage on the DC power source side of the electric power converter from being considerably increased and thus the torque generated by the rotating electric machine from being rapidly increased.

Exemplary embodiments and their modifications will be described hereinafter with reference to FIGS. 1-23. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine control system which includes a three-phase rotating electric machine 10, a three-phase inverter (i.e., an electric power converter) 20 and a control circuit 30 according to the first embodiment.

In the present embodiment, the rotating electric machine control system is used in a vehicle such as an electric vehicle or a hybrid vehicle.

The rotating electric machine 10 is employed as a main rotating electric machine in the vehicle. The rotating electric machine 10 has a rotor mechanically connected with driving wheels (not shown) of the vehicle; thus mechanical power (or torque) can be transmitted between the rotor and the driving wheels. In the present embodiment, the rotating electric machine 10 is configured as a synchronous machine, more particularly as an interior permanent magnet synchronous machine.

The rotating electric machine 10 has three phase windings 11 electrically connected to a storage battery (i.e., a DC power source) 21 via the inverter 20. The output voltage of the storage battery 21 is, for example, higher than or equal to 100V. In addition, on the input side of the inverter 20, there is provided a smoothing capacitor 22 to smooth the input voltage of the inverter 20.

The inverter 20 includes three switch pairs each corresponding to one of three phases of the rotating electric machine 10 and consisting of an upper-arm switch SWH and a lower-arm switch SWL that are electrically connected in series with each other.

For each of the three phases, to a node (or junction point) between the upper-arm and lower-arm switches SWH and SWL of the switch pair corresponding to the phase, there is connected a first end of that one of the phase windings 11 of the rotating electric machine 10 which corresponds to the phase. On the other hand, second ends of the phase windings 11 are connected together at a neutral point. Moreover, the phase windings 11 are arranged in the rotating electric machine 10 so as to be offset from each other by 120° in electrical angle.

In the present embodiment, each of the upper-arm and lower-arm switches SWH and SWL is configured with a voltage-controlled semiconductor switching element, more particularly with an IGBT (Insulated Gate Bipolar Transistor). Moreover, each of the upper-arm switches SWH has an upper-arm diode DH, which is a freewheeling diode, connected in antiparallel thereto. Similarly, each of the lower-arm switches SWL has a lower-arm diode DL, which is a freewheeling diode, connected in antiparallel thereto.

Each of the upper-arm switches SWH has its collector (i.e., high potential-side terminal) electrically connected with a positive terminal of the storage battery 21. On the other hand, each of the lower-arm switches SWL has its emitter (i.e., low potential-side terminal) electrically connected with a negative terminal of the storage battery 21.

Figure 2:
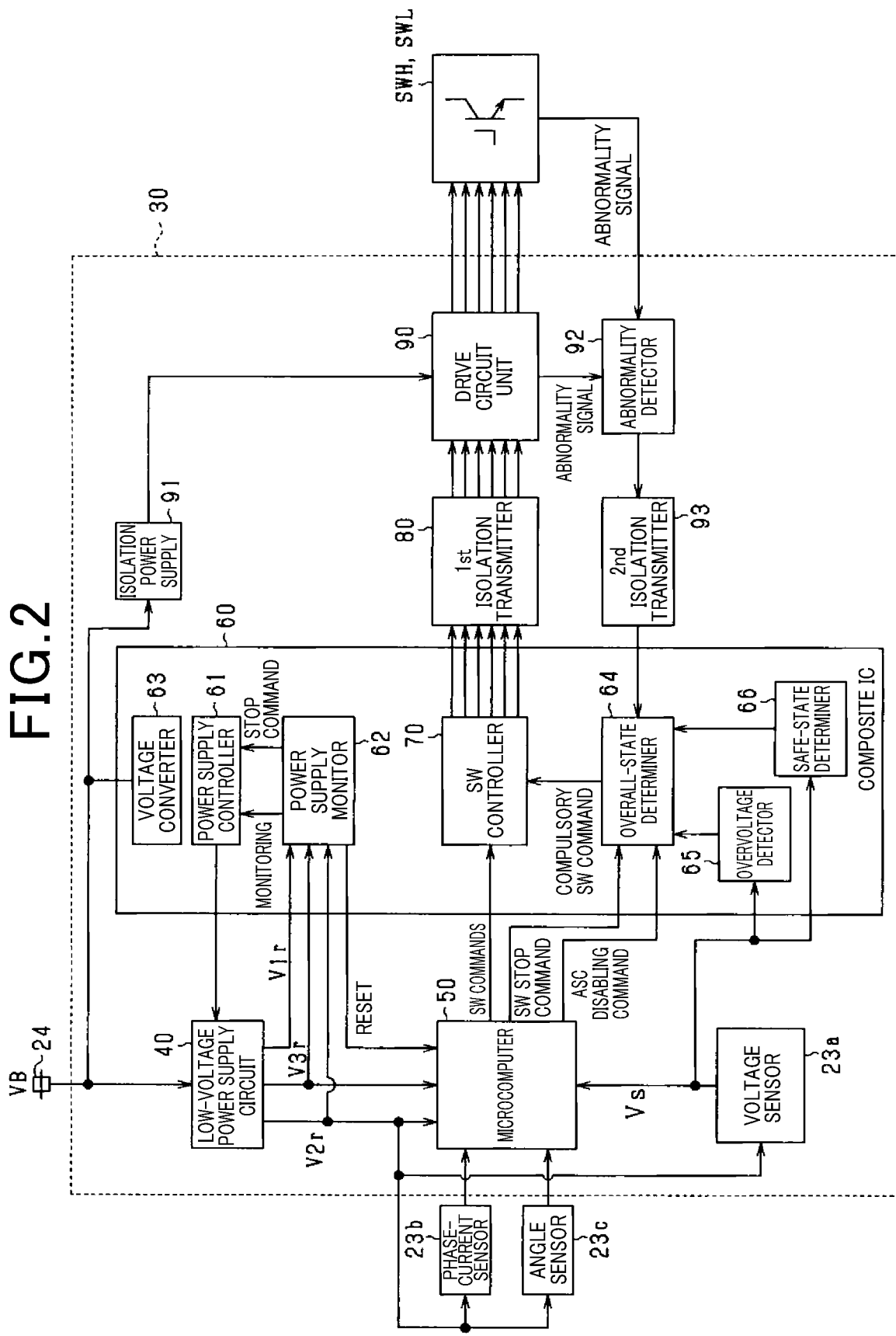
FIG. 2 is a schematic diagram illustrating the configuration of the control circuit according to the first embodiment.

As shown in FIGS. 1 and 2, the rotating electric machine control system includes a voltage sensor 23a, a phase-current sensor 23b and an angle sensor 23c.

The voltage sensor 23a (see FIG. 2) is configured to output a voltage signal Vs indicative of a terminal voltage of the smoothing capacitor 22.

The phase-current sensor 23b is configured to output a current signal indicative of at least two of three phase currents respectively flowing in the three phase windings 11 of the rotating electric machine 10.

The angle sensor 23c is configured to output an angle signal indicative of an electrical angle of the rotating electric machine 10. The angle sensor 23c is implemented by, for example, a resolver, an encoder or an MR (Magneto-Resistive) sensor that includes a magnetoresistance-effect element.

In addition, in the present embodiment, the voltage sensor 23a is built in the control circuit 30, whereas both the phase-current sensor 23b and the angle sensor 23c are arranged outside the control circuit 30.

As shown in FIG. 2, the control circuit 30 includes a microcomputer 50 that generates switching (abbreviated to SW in FIG. 2) commands for controlling switching of the switches SWH and SWL of the inverter 20 and thereby controlling a controlled value of the rotating electric machine 10 to its desired value. The controlled variable is, for example, torque.

Specifically, the microcomputer 50, which corresponds to a "command generator", generates the switching commands on the basis of the output signals of the sensors 23a-23c. More specifically, the microcomputer 50 generates the switching commands so as to have the upper-arm switch SWH and the lower-arm switch SWL alternately turned on in each of the three switch pairs of the inverter 20.

Moreover, the microcomputer 50 calculates, based on the voltage signal Vs outputted from the voltage sensor 23a, the terminal voltage of the smoothing capacitor 22 as a power source voltage VDC. The microcomputer 50 also calculates, based on the current signal outputted from the phase-current sensor 23b, at least two of the three phase currents respectively flowing in the three phase windings 11 of the rotating electric machine 10. The microcomputer 50 also calculates, based on the angle signal outputted from the angle sensor 23c, the electrical angle θe of the rotating electric machine 10. Then, based on the calculated electrical angle θe, the microcomputer 50 further calculates the electrical angular speed we of the rotating electric machine 10.

Next, the configuration of the control circuit 30 according to the present embodiment will be described in detail with reference to FIG. 2.

The control circuit 30 further includes a low-voltage power supply circuit 40, which corresponds to a "power supply unit", and a composite IC (Integrated Circuit) 60 in addition to the microcomputer 50.

The composite IC 60 includes a power supply controller 61, a power supply monitor 62 and a voltage converter 63.

The power supply controller 61 is configured to control the low-voltage power supply circuit 40.

The power supply monitor 62 is configured to output, upon determination that predetermined conditions are satisfied, a rest signal to the microcomputer 50. Upon the reset signal being inputted to the microcomputer 50, operation of the microcomputer 50 is stopped; thus the generation and output of the switching commands are stopped.

The voltage converter 63 is configured to covert the voltage inputted from a low-voltage DC power source 24 into a voltage of such a level as to be used in the composite IC 60. Then, the voltage converter 63 outputs the resultant voltage.

The low-voltage power supply circuit 40 has a function of stepping down an output voltage VB of the low-voltage DC power source 24. The output voltage VB of the low-voltage DC power source 24 is lower than the output voltage of the storage battery 21.

In addition, at least part of various functions of the control circuit 30 may be realized by software stored in a tangible memory device and a computer (e.g., the microcomputer 50) that executes the software, by hardware, or by a combination of the aforementioned means.

The low-voltage power supply circuit 40 generates a first output voltage V1r, a second output voltage V2r and a third output voltage V3r by stepping down the output voltage VB of the low-voltage DC power source 24. The first output voltage V1r is set to be lower than the output voltage VB of the low-voltage DC power source 24. The second output voltage V2r (e.g., equal to 5V) is set to be lower than the first output voltage V1r. The third output voltage V3r (e.g., equal to 1.2V) is set to be lower than the second output voltage V2r.

Divided-voltage values of the first, second and third output voltages Vr1, Vr2 and Vr3 are inputted to the power supply monitor 62. Then, based on the inputted divided-voltage values, the power supply monitor 62 detects the first, second and third output voltages Vr1, Vr2 and Vr3.

The second output voltage V2r is supplied to the voltage sensor 23a, the phase-current sensor 23b and the angle sensor 23c, thereby enabling these sensors 23a-23c to respectively output the voltage signal, the current signal and the angle signal.

The microcomputer 50 includes a CPU (Central Processing Unit) and peripheral circuits which include, for example, an A/D converter and an input/output unit for exchanging signals with external devices or circuits. The third output voltage V3r of the low-voltage power supply circuit 40 is supplied to the CPU of the microcomputer 50, whereas the second output voltage V2r of the low-voltage power supply circuit 40 is supplied to the peripheral circuits of the microcomputer 50.

The control circuit 30 further includes a first isolation transmitter 80, a drive circuit unit 90, an isolation power supply 91, an abnormality detector 92 and a second isolation transmitter 93.

In the present embodiment, each of the first isolation transmitter 80 and the second isolation transmitter 93 is constituted of a photocoupler that is an optical isolation element.

The isolation power supply 91, whose electric power source is the low-voltage DC power source 24, is configured to supply electric power to drive circuits that together constitute the drive circuit unit 90.

The drive circuit unit 90 includes the drive circuits that respectively correspond to the six switches SWH and SWL of the inverter 20. That is, the number of the drive circuits is equal to six in the present embodiment. In addition, the drive circuits respectively drive the switches SWH and SWL of the inverter 20 upon supply of electric power from the isolation power supply 91 to the drive circuit unit 90.

The composite IC 60 further includes a switch (abbreviated to SW in FIG. 2) controller 70, an overall-state determiner 64 and an overvoltage detector 65.

The switch controller 70 is configured to transmit the switching commands, which are outputted from the microcomputer 50, to the drive circuit unit 90 via the first isolation transmitter 80.

The overvoltage detector 65 detects the power source voltage VDC on the basis of the voltage signal Vs outputted from the voltage sensor 23a. Moreover, when the detected power source voltage VDC is higher than a power source voltage threshold, the overvoltage detector 65 determines that an overvoltage abnormality has occurred and notifies the switch controller 70 of the occurrence of the overvoltage abnormality.

In addition, instead of determining the power source voltage VDC by itself, the overvoltage detector 65 may acquire the power source voltage VDC detected by the microcomputer 50.

Figure 3:
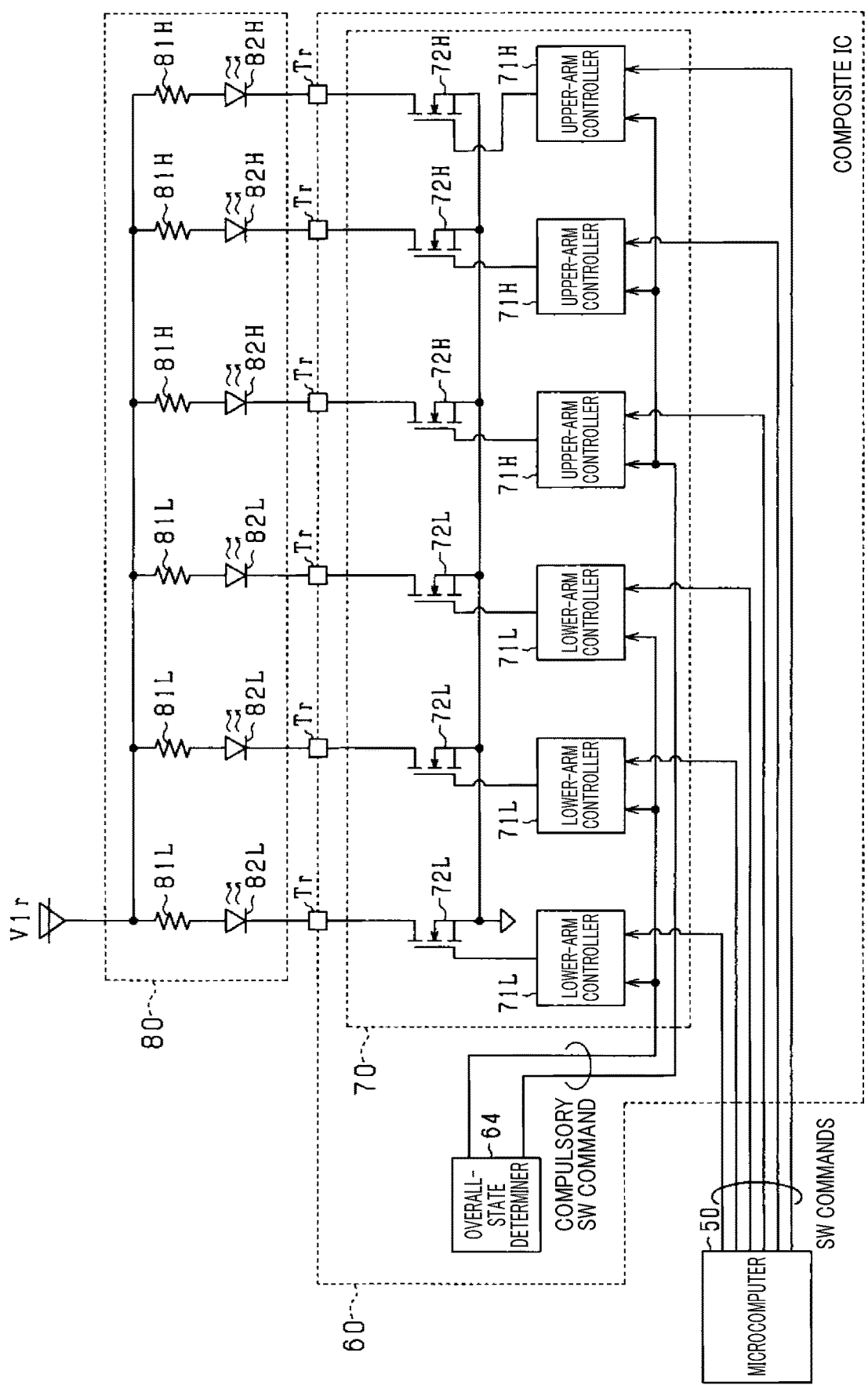
FIG. 3 is a schematic diagram illustrating the configuration of a composite IC and a first isolation transmitter of the control circuit according to the first embodiment.

FIG. 3 shows both the configuration of the switch controller 70 and the configuration of a photodiode-side part of the first isolation transmitter 80.

As shown in FIG. 3, the switch controller 70 includes three upper-arm controller 71H for respectively controlling the upper-arm switches SWH of the inverter 20, three high switches 72H respectively corresponding to the upper-arm switches SWH, three lower-arm controller 71L for respectively controlling the lower-arm switches SWL of the inverter 20, and three low switches 72L respectively corresponding to the lower-arm switches SWL.

In the present embodiment, each of the high and low switches 72H and 72L is configured with an N-channel MOSFET (Metal-Oxide-Semiconductor Field-Effect Transistor).

On the other hand, the first isolation transmitter 80 includes three upper-arm photodiodes 82H respectively corresponding to the upper-arm switches SWH of the inverter 20, three upper-arm resistors 81H respectively corresponding to the upper-arm switches SWH, three lower-arm photodiodes 82L respectively corresponding to the lower-arm switches SWL of the inverter 20, and three lower-arm resistors 81L respectively corresponding to the lower-arm switches SWL.

Each of the upper-arm resistors 81H has a first end to which the first output voltage V1r of the low-voltage power supply circuit 40 is applied, and a second end to which the drain of the corresponding high switch 72H is connected via the corresponding upper-arm photodiode 82H and a corresponding one of six terminals Tr of the composite IC 60. In addition, the source of the corresponding high switch 72H is grounded.

Similarly, each of the lower-arm resistors 81L has a first end to which the first output voltage V1r of the low-voltage power supply circuit 40 is applied, and a second end to which the drain of the corresponding low switch 72L is connected via the corresponding lower-arm photodiode 82L and a corresponding one of the six terminals Tr of the composite IC 60. In addition, the source of the corresponding low switch 72L is grounded.

To each of the upper-arm controllers 71H, there is inputted, from the microcomputer 50, the switching command for controlling switching of the upper-arm switch SWH of the inverter 20 corresponding to the upper-arm controller 71H. Specifically, in the present embodiment, each of the upper-arm controllers 71H transmits, by turning on the corresponding high switch 72H, an ON command as the switching command to the corresponding drive circuit of the drive circuit unit 90 via the corresponding upper-arm photodiode 82H and the corresponding upper-arm phototransistor (not shown) of the first isolation transmitter 80. Moreover, each of the upper-arm controllers 71H transmits, by turning off the corresponding high switch 72H, an OFF command as the switching command to the corresponding drive circuit of the drive circuit unit 90 via the corresponding upper-arm photodiode 82H and the corresponding upper-arm phototransistor (not shown) of the first isolation transmitter 80. Upon receipt of the switching command, the corresponding drive circuit determines whether the switching command is the ON command or the OFF command. Then, the corresponding drive circuit turns on the corresponding upper-arm switch SWH when the switching command is determined to be the ON command and turns off the corresponding upper-arm switch SWH when the switching command is determined to be the OFF command.

To each of the upper-arm controllers 71H, there is also inputted a compulsory switching command that is outputted from the overall-state determiner 64. The compulsory switching command is either a shutdown command or an ASC (Active Short Circuit) command.

Each of the upper-arm controllers 71H determines whether the compulsory switching command has been inputted thereto from the overall-state determiner 64. Moreover, when it is determined that no compulsory switching command has been inputted thereto, each of the upper-arm controllers 71H turns on or off the corresponding high switch 72H according to the switching command from the microcomputer 50. Consequently, the ON command or the OFF command is transmitted to the corresponding drive circuit of the drive circuit unit 90 via the first isolation transmitter 80. As a result, the corresponding upper-arm switch SWH of the inverter 20 is turned on or off by the corresponding drive circuit depending on whether the switching command is the ON command or the OFF command. On the other hand, when it is determined that the compulsory switching command has been inputted thereto, each of the upper-arm controllers 71H keeps the corresponding high switch 72H off regardless of whether the switching command from the microcomputer 50 has been inputted thereto. Consequently, the OFF command is transmitted to the corresponding drive circuit of the drive circuit unit 90 via the first isolation transmitter 80. As a result, the corresponding upper-arm switch SWH of the inverter 20 is turned or kept off.

To each of the lower-arm controllers 71L, there is inputted, from the microcomputer 50, the switching command for controlling switching of the lower-arm switch SWL of the inverter 20 corresponding to the lower-arm controller 71L. Specifically, in the present embodiment, each of the lower-arm controllers 71L transmits, by turning on the corresponding low switch 72L, an ON command as the switching command to the corresponding drive circuit of the drive circuit unit 90 via the corresponding lower-arm photodiode 82L and the corresponding lower-arm phototransistor (not shown) of the first isolation transmitter 80. Moreover, each of the lower-arm controllers 71L transmits, by turning off the corresponding low switch 72L, an OFF command as the switching command to the corresponding drive circuit of the drive circuit unit 90 via the corresponding lower-arm photodiode 82L and the corresponding lower-arm phototransistor (not shown) of the first isolation transmitter 80. Upon receipt of the switching command, the corresponding drive circuit determines whether the switching command is the ON command or the OFF command.

Then, the corresponding drive circuit turns on the corresponding lower-arm switch SWL when the switching command is determined to be the ON command and turns off the corresponding lower-arm switch SWL when the switching command is determined to be the OFF command.

To each of the lower-arm controllers 71L, there is also inputted a compulsory switching command that is outputted from the overall-state determiner 64. The compulsory switching command is either a shutdown command or an ASC command.

Each of the lower-arm controllers 71L determines whether the compulsory switching command has been inputted thereto from the overall-state determiner 64. Moreover, when it is determined that no compulsory switching command has been inputted thereto, each of the lower-arm controllers 71L turns on or off the corresponding low switch 72L according to the switching command from the microcomputer 50. Consequently, the ON command or the OFF command is transmitted to the corresponding drive circuit of the drive circuit unit 90 via the first isolation transmitter 80. As a result, the corresponding lower-arm switch SWL of the inverter 20 is turned on or off by the corresponding drive circuit depending on whether the switching command is the ON command or the OFF command. On the other hand, when it is determined that the shutdown command has been inputted thereto as the compulsory switching command, each of the lower-arm controllers 71L keeps the corresponding low switch 72L off regardless of whether the switching command from the microcomputer 50 has been inputted thereto. Consequently, the OFF command is transmitted to the corresponding drive circuit of the drive circuit unit 90 via the first isolation transmitter 80. As a result, the corresponding lower-arm switch SWL of the inverter 20 is turned or kept off. In contrast, when it is determined that the ASC command has been inputted thereto as the compulsory switching command, each of the lower-arm controllers 71L keeps the corresponding low switch 72L on regardless of whether the switching command from the microcomputer 50 has been inputted thereto. Consequently, the ON command is transmitted to the corresponding drive circuit of the drive circuit unit 90 via the first isolation transmitter 80. As a result, the corresponding lower-arm switch SWL of the inverter 20 is turned or kept on.

In addition, the logical value representing the ON command and the logical value representing the OFF command may be opposite to the logical values transmitted with the configuration shown in FIG. 3.

Referring back to FIG. 2, the abnormality detector 92 detects abnormalities occurring in the upper-arm and lower-arm switches SWH and SWL of the inverter 20 and the drive circuit unit 90. Moreover, upon determination that an abnormality (to be referred as switch-side abnormality hereinafter) has occurred in at least one of the upper-arm and lower-arm switches SWH and SWL and the drive circuit unit 90, the abnormality detector 92 transmits an abnormality signal to the overall-state determiner 64 via the second isolation transmitter 93.

In addition, as the abnormalities occurring in the upper-arm and lower-arm switches SWH and SWL, the abnormality detector 92 detects at least one of an overcurrent abnormality in which the electric current flowing through any one of the switches exceeds an overcurrent threshold, an overheating abnormality in which the temperature of any one of the switches exceeds a temperature threshold, and a voltage deviation abnormality in which the voltage Vce between the collector and the emitter in any one of the switches falls outside a predetermined range. On the other hand, as the abnormalities occurring in the drive circuit unit 90, the abnormality detector 92 detects at least one of an abnormality in which no electric power is outputted from the isolation power supply 91 to the drive circuit unit 90, an abnormality in which the voltage supplied by the isolation power supply 91 to the drive circuit unit 90 drops below a low-voltage threshold, an abnormality in which the voltage supplied by the isolation power supply 91 to the drive circuit unit 90 exceeds an overvoltage threshold, and an abnormality in which variation in the voltage supplied by the isolation power supply 91 to the drive circuit unit 90 exceeds a predetermined value.

Upon determination that an abnormality has occurred in at least one of the sensors 23a-23c and the microcomputer 50, the microcomputer 50 stops the generation and output of the switching commands and outputs a switching stop command to the overall-state determiner 64.

In addition, as the abnormalities occurring in the sensors 23a-23c, the microcomputer 50 detects at least one of an abnormality in which any one of the sensors has no signal outputted therefrom, an abnormality in which the output signal of any one of the sensors drops below a first predetermined threshold, an abnormality in which the output signal of any one of the sensors exceeds a second predetermined threshold, and an abnormality in which the output characteristics of any one of the sensors are not normal. On the other hand, the determination as to whether an abnormality has occurred in the microcomputer 50 is made based on the results of a diagnosis performed by the microcomputer 50 itself or by a diagnosing unit provided outside the microcomputer 50.

The composite IC 60 further includes a safe-state determiner 66. The safe-state determiner 66 calculates the power source voltage VDC on the basis of the voltage signal Vs outputted from the voltage sensor 23a. Then, the safe-state determiner 66 determines, based on the calculated power source voltage VDC, the content of the compulsory switching command to be outputted from the overall-state determiner 64.

Figure 4:
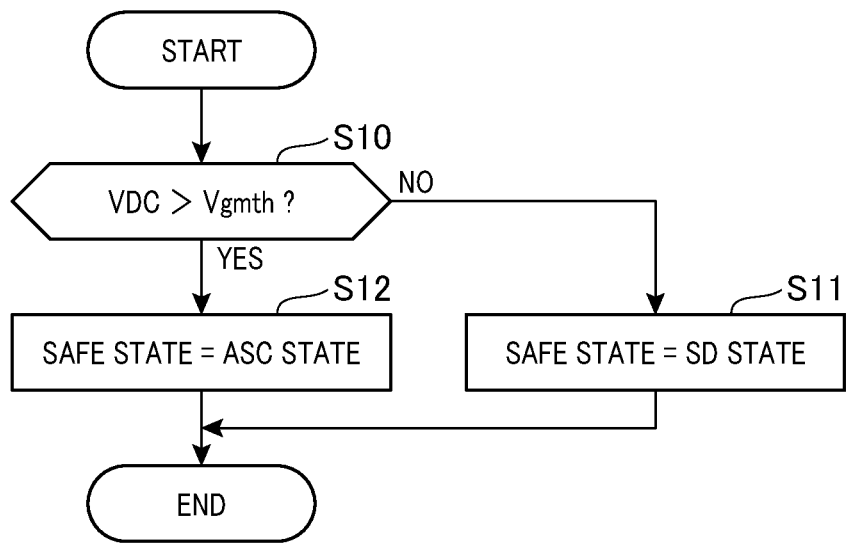
FIG. 4 is a flow chart illustrating a safe-state determination process performed by a safe-state determiner of the control circuit according to the first embodiment.

FIG. 4 shows a safe-state determination process performed by the safe-state determiner 66. In addition, this process is repeatedly performed in a predetermined cycle by the safe-state determiner 66.

In step S10, the safe-state determiner 66 calculates the power source voltage VDC on the basis of the voltage signal Vs outputted from the voltage sensor 23a, and determines whether the calculated power source voltage VDC is higher than a predetermined voltage Vgmth.

In addition, this determination is made for determining whether regeneration is being performed. The safe-state determiner 66 corresponds to both a "power source voltage detector" and a "voltage determiner". In the present embodiment, the predetermined voltage Vgmth is set to a minimum value in a normal range of the terminal voltage of the storage battery 21 or to a value higher than the minimum value and lower than a maximum value in the normal range. Here, the normal range denotes the range within which the terminal voltage of the storage battery 21 varies during normal operation of the storage battery 21.

If the determination in step S10 results in a "NO" answer, i.e., if the calculated power source voltage VDC is not higher than the predetermined voltage Vgmth, the process proceeds to step S11.

In step S11, the safe-state determiner 66 determines that the line-to-line voltage between the phase windings 11 of the rotating electric machine 10 is not higher than the terminal voltage of the storage battery 21 and thus no regeneration is being performed. Then, the safe-state determiner 66 determines that when it is determined in step S20 of FIG. 5 (to be described later) that at least one of the abnormalities has occurred, the rotating electric machine control system can be brought into a safe state (i.e., shutdown state) by setting the compulsory switching command, which is to be outputted from the overall-state determiner 64, to the shutdown (abbreviated to SD in FIGS. 4 and 5) command. Thereafter, the process terminates.

On the other hand, if the determination in step S10 results in a "YES" answer, i.e., if the calculated power source voltage VDC is higher than the predetermined voltage Vgmth, the process proceeds to step S12.

In step S12, the safe-state determiner 66 determines that the line-to-line voltage between the phase windings 11 of the rotating electric machine 10 is higher than the terminal voltage of the storage battery 21 and thus regeneration is being performed. Then, the safe-state determiner 66 determines that when it is determined in step S20 of FIG. 5 that at least one of the abnormalities has occurred, the rotating electric machine control system can be brought into a safe state (i.e., all-phase short circuit state) by setting the compulsory switching command, which is to be outputted from the overall-state determiner 64, to the ASC command. Thereafter, the process terminates.

In addition, the results of the determinations made by the safe-state determiner 66 in steps S11 and S12 of the above process are inputted to the overall-state determiner 64.

Figure 5:
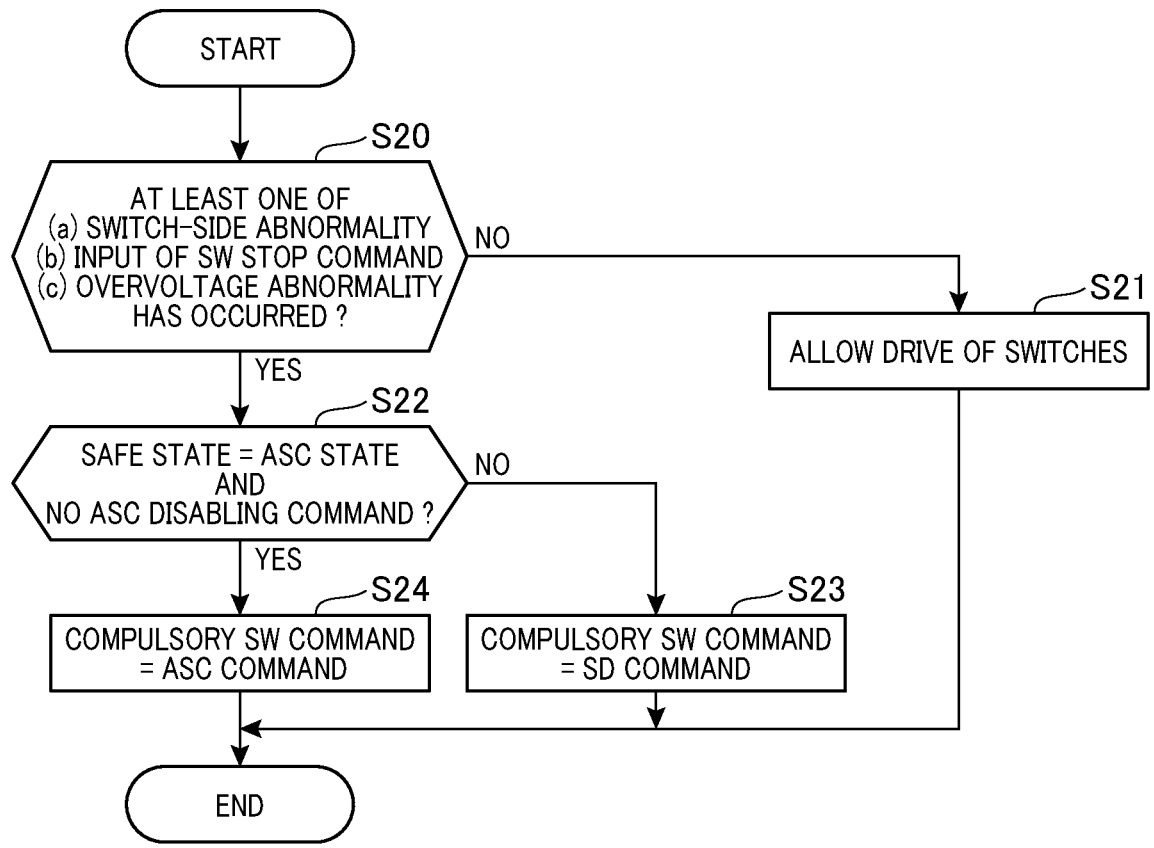
FIG. 5 is a flow chart illustrating an overall-state determination process performed by an overall-state determiner of the control circuit according to the first embodiment.

FIG. 5 shows an overall-state determination process performed by the overall-state determiner 64. In addition, this process is repeatedly performed in a predetermined cycle by the overall-state determiner 64.

In step S20, the overall-state determiner 64 determines whether at least one of the following events has occurred: (a) the notification of a switch-side abnormality from the abnormality detector 92; (b) the input of the switching stop command from the microcomputer 50; and (c) the notification of the overvoltage abnormality from the overvoltage detector 65.

In addition, the determination as to whether a switch-side abnormality has occurred can be made by determining whether the abnormality signal has been transmitted from the abnormality detector 92 via the second isolation transmitter 93. In the present embodiment, the overall-state determiner 64 corresponds to an "abnormality determiner" that performs step S20.

If the determination in step S20 results in a "NO" answer, i.e., if none of the events (a)-(c) has occurred, the process proceeds to step S21.

In step S21, the overall-state determiner 64 refrains from outputting the compulsory switching command to the switch controller 70. That is, the overall-state determiner 64 allows continuation of the switching control (or drive) of the upper-arm and lower-arm switches SWH and SWL of the inverter 20 according to the switching commands outputted from the microcomputer 50.

On the other hand, if the determination in step S20 results in a "YES" answer, i.e., if at least one of the events (a)-(c) has occurred, the process proceeds to step S22.

In step S22, the overall-state determiner 64 further determines whether both the following two conditions are satisfied: (1) a determination result has been inputted from the safe-state determiner 66 and the determination result indicates that the rotating electric machine control system can be brought into a safe state (i.e., all-phase short circuit state) by setting the compulsory switching command to the ASC command; and (2) an ASC disabling command, which will be described in detail later, has not been inputted from the microcomputer 50.

If the determination in step S22 results in a "NO" answer, i.e., if neither of the above two conditions is satisfied, the process proceeds to step S23. In other words, the process proceeds to step S23 if at least one of the following two conditions is satisfied: (3) a determination result has been inputted from the safe-state determiner 66 and the determination result indicates that the rotating electric machine control system can be brought into a safe state (i.e., shutdown state) by setting the compulsory switching command to the shutdown command; and (4) the ASC disabling command has been inputted from the microcomputer 50.

In step S23, the overall-state determiner 64 outputs the shutdown command as the compulsory switching command to the upper-arm and lower-arm controllers 71H and 71L of the switch controller 70. Consequently, a shutdown control is performed by the switch controller 70 to turn off all of the upper-arm and lower-arm switches SWH and SWL of the inverter 20.

In contrast, if the determination in step S22 results in a "YES" answer, i.e., if both the above two conditions are satisfied, the process proceeds to step S24.

In step S24, the overall-state determiner 64 outputs the ASC command as the compulsory switching command to the upper-arm and lower-arm controllers 71H and 71L of the switch controller 70. Consequently, an All-phase Short Circuit control (to be referred to as ASC control hereinafter) is performed by the switch controller 70 to turn off all of the upper-arm switches SWH of the inverter 20 while turning on all of the lower-arm switches SWL of the inverter 20.

In addition, the overall-state determiner 64 also corresponds to an "abnormality-handling controller" that performs steps S22-S24.

Next, the ASC disabling command will be described in detail.

Figure 6:
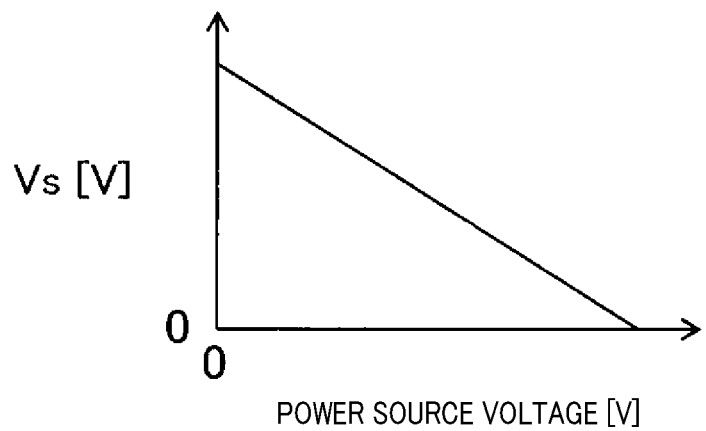
FIG. 6 is a graph illustrating the characteristics of a voltage sensor included in the rotating electric machine control system.

In the present embodiment, as shown in FIG. 6, the voltage sensor 23a outputs the voltage signal Vs that decreases with increase in the actual terminal voltage of the storage battery 21. On the other hand, the second output voltage V2r of the low-voltage power supply circuit 40 may become low during the activation of the low-voltage power supply circuit 40 or in the case of a failure of the low-voltage power supply circuit 40. Moreover, when the second output voltage V2r becomes low, the voltage signal Vs of the voltage sensor 23a may also become low though the actual terminal voltage of the storage battery 21 is low. In this case, the detected power source voltage VDC becomes high; thus though the terminal voltage of the storage battery 21 is actually low, it is erroneously determined to be high. Consequently, though it is actually necessary to perform the shutdown control, the ASC control may be accidently performed instead.

In view of the above, in the present embodiment, the microcomputer 50 determines whether the second output voltage V2r of the low-voltage power supply circuit 40 is lower than a predetermined voltage. Moreover, when the second output voltage V2r of the low-voltage power supply circuit 40 is determined to be lower than the predetermined voltage, the microcomputer 50 outputs the ASC disabling command to the overall-state determiner 64. In contrast, when the second output voltage V2r of the low-voltage power supply circuit 40 is determined to be higher than or equal to the predetermined voltage, the microcomputer 50 refrains from outputting the ASC disabling command to the overall-state determiner 64. Accordingly, when it is determined in step S22 of FIG. 5 that the ASC disabling command has been inputted from the microcomputer 50, the overall-state determiner 64 determines the second output voltage V2r of the low-voltage power supply circuit 40 to be lower than the predetermined voltage; thus in subsequent step S23, the overall-state determiner 64 outputs the shutdown command as the compulsory switching command to the upper-arm and lower-arm controllers 71H and 71L of the switch controller 70. Consequently, the ASC control is not performed even when the line-to-line voltage between the phase windings 11 of the rotating electric machine 10 is determined in step S12 of FIG. 4 to be higher than the terminal voltage of the storage battery 21. As a result, it becomes possible to prevent the ASC control from being accidentally performed.

Moreover, the microcomputer 50 may output a continuous pulse signal as the ASC disabling command to the overall-state determiner 64. In this case, the overall-state determiner 64 determines that the ASC disabling command has been inputted thereto when it is determined that the pulse signal has been inputted thereto, and determines that the ASC disabling command has not been inputted thereto when it is determined that the pulse signal has not been inputted thereto. Consequently, it becomes possible to prevent the ASC disabling command from being accidentally transmitted to the overall-state determiner 64 due to signal sticking. In addition, it should be noted that the microcomputer 50 may also output, instead of a pulse signal, a digital signal of logical H or L as the ASC disabling command.

Figure 7:
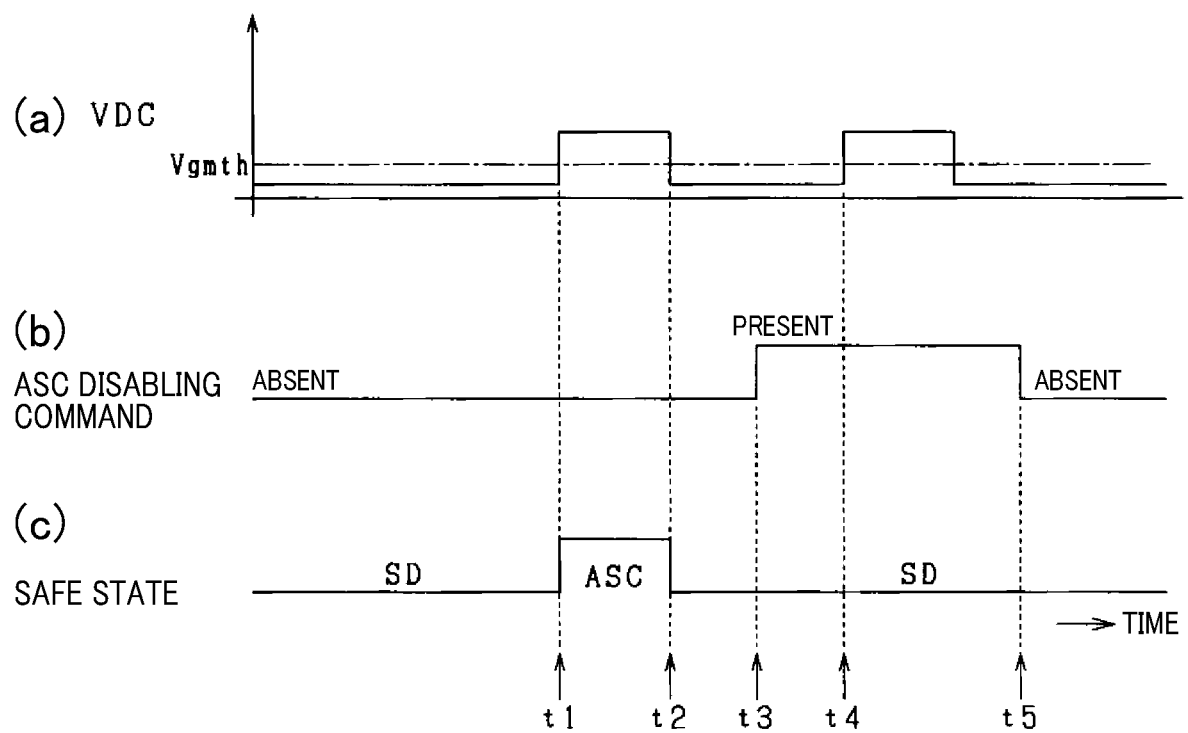
FIG. 7 is a time chart illustrating the changes with time of (a) a power source voltage, (b) the presence or absence of an ASC disabling command and (c) the content of a compulsory switching command for bringing the rotating electric machine control system into a safe state according to the first embodiment.

FIG. 7 illustrates the changes with time of (a) the power source voltage VDC, (b) the presence or absence of the ASC disabling command outputted from the microcomputer 50 and (c) the content of the compulsory switching command for bringing the rotating electric machine control system into a safe state.

At a time instant t1, it is determined by the safe-state determiner 66 that: the power source voltage VDC becomes higher than the predetermined voltage Vgmth; and the rotating electric machine control system can be brought into a safe state (i.e., all-phase short circuit state) by setting the compulsory switching command to the ASC command.

Then, at a time instant t2, it is determined by the safe-state determiner 66 that: the power source voltage VDC becomes lower than the predetermined voltage Vgmth; and the rotating electric machine control system can be brought into a safe state (i.e., shutdown state) by setting the compulsory switching command to the shutdown (abbreviated to SD in FIG. 7) command.

Thereafter, at a time instant t3, the ASC disabling command is inputted from the microcomputer 50 to the overall-state determiner 64.

Consequently, at a time instant t4, though the power source voltage VDC again becomes higher than the predetermined voltage Vgmth, it is still determined by the safe-state determiner 66 that the rotating electric machine control system can be brought into a safe state (i.e., shutdown state) by setting the compulsory switching command to the shutdown command.

Thereafter, at a time instant t5, the output of the ASC disabling command from the microcomputer 50 is stopped.

According to the present embodiment, it is possible to achieve the following advantageous effects.

In the present embodiment, the ASC control is performed instead of the shutdown control upon: (1) determination by the overall-state determiner 64 that at least one of a switch-side abnormality, the input of the switching stop command and the overvoltage abnormality has occurred; and (2) determination by the safe-state determiner 66 that the line-to-line voltage between the phase windings 11 of the rotating electric machine 10 when a counterelectromotive force is generated in the phase windings 11 is higher than the terminal voltage of the storage battery 21. When the ASC control is performed, no closed circuit is formed which includes the upper-arm and lower-arm diodes DH and DL of the inverter 20, the phase windings 11 of the rotating electric machine 10 and the storage battery 21. Instead, a closed circuit is formed which includes the turned-on lower-arm switches SWL of the inverter 20 and the phase windings 11 of the rotating electric machine 10. Consequently, it becomes possible to cause electric current induced in the phase windings 11 of the rotating electric machine 10 to flow within the formed closed circuit, thereby preventing regeneration from being performed. As a result, it becomes possible to prevent the terminal voltage of the smoothing capacitor 22 from being considerably increased and the torque generated by the rotating electric machine 10 from being rapidly increased.

Moreover, in the present embodiment, the overall-state determiner 64, the safe-state determiner 66 and the switch controller 70 are integrated into the single composite IC 60. Consequently, it becomes possible to shorten the time from when the determination in step S20 of FIG. 5 results in a "YES" answer until the ASC control or the shutdown control is performed.

Modification of First Embodiment

The safe-state determination process shown in FIG. 4, which is performed by the safe-state determiner 66, may be suitably modified.

For example, hysteresis may be provided in switching between the determination in step S11 and the determination in step S12. Specifically, in this case, when the voltage signal Vs of the voltage sensor 23a is determined to be lower than a first predetermined threshold ASCL, the safe-state determiner 66 determines that the rotating electric machine control system can be brought into a safe state (i.e., all-phase short circuit state) by setting the compulsory switching command, which is to be outputted from the overall-state determiner 64, to the ASC command. On the other hand, when the voltage signal Vs of the voltage sensor 23a is determined to be higher than a second predetermined threshold ASCH that is higher than the first predetermined threshold ASCL, the safe-state determiner 66 determines that the rotating electric machine control system can be brought into a safe state (i.e., shutdown state) by setting the compulsory switching command, which is to be outputted from the overall-state determiner 64, to the shutdown command. With the above configuration, it is possible to prevent chattering.

Second Embodiment

A control circuit 30 according to the second embodiment has a similar configuration to the control circuit 30 according to the first embodiment. Therefore, the differences therebetween will be mainly described hereinafter.

Figure 8:
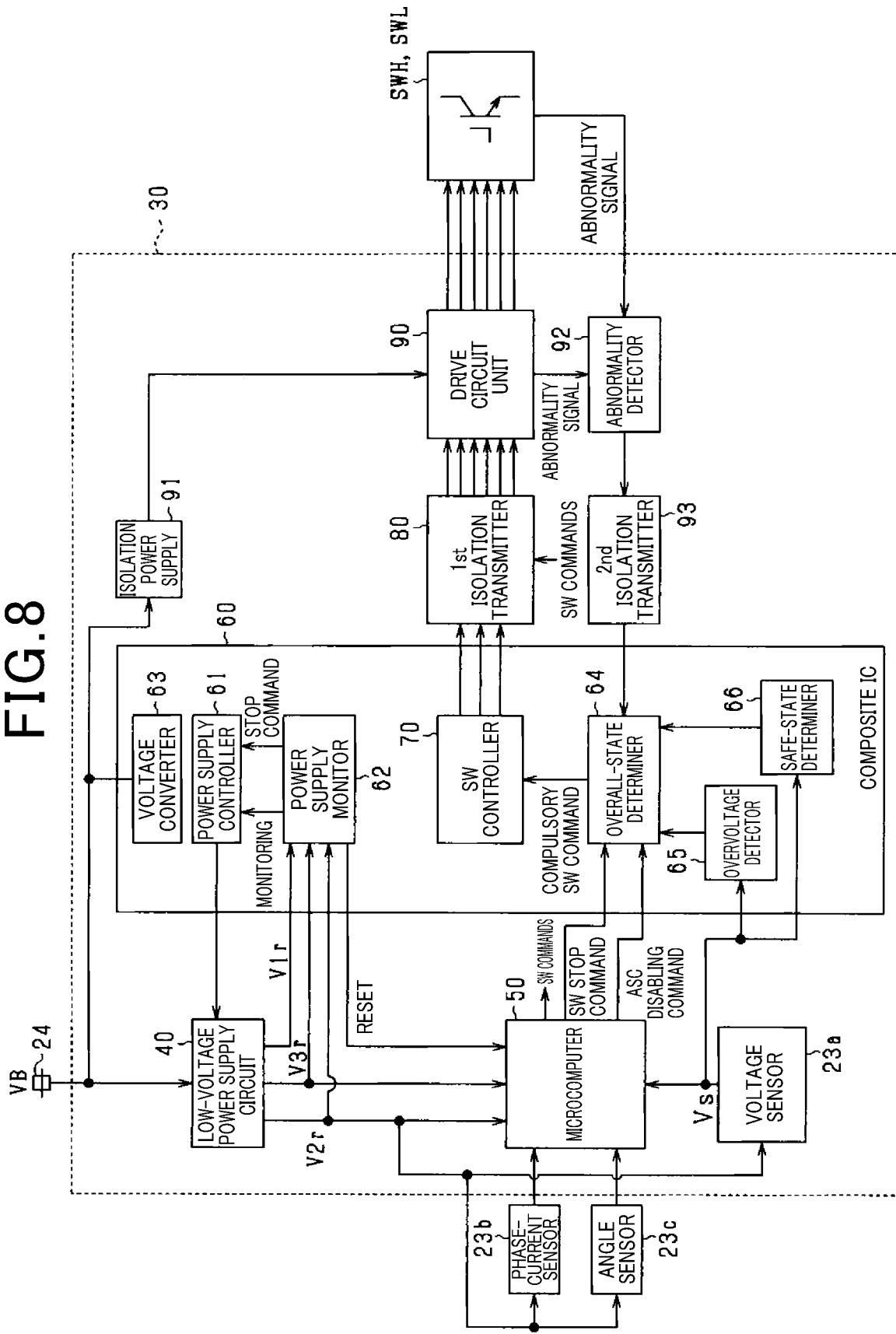
FIG. 8 is a schematic diagram illustrating the configuration of a control circuit according to a second embodiment.
Figure 9:
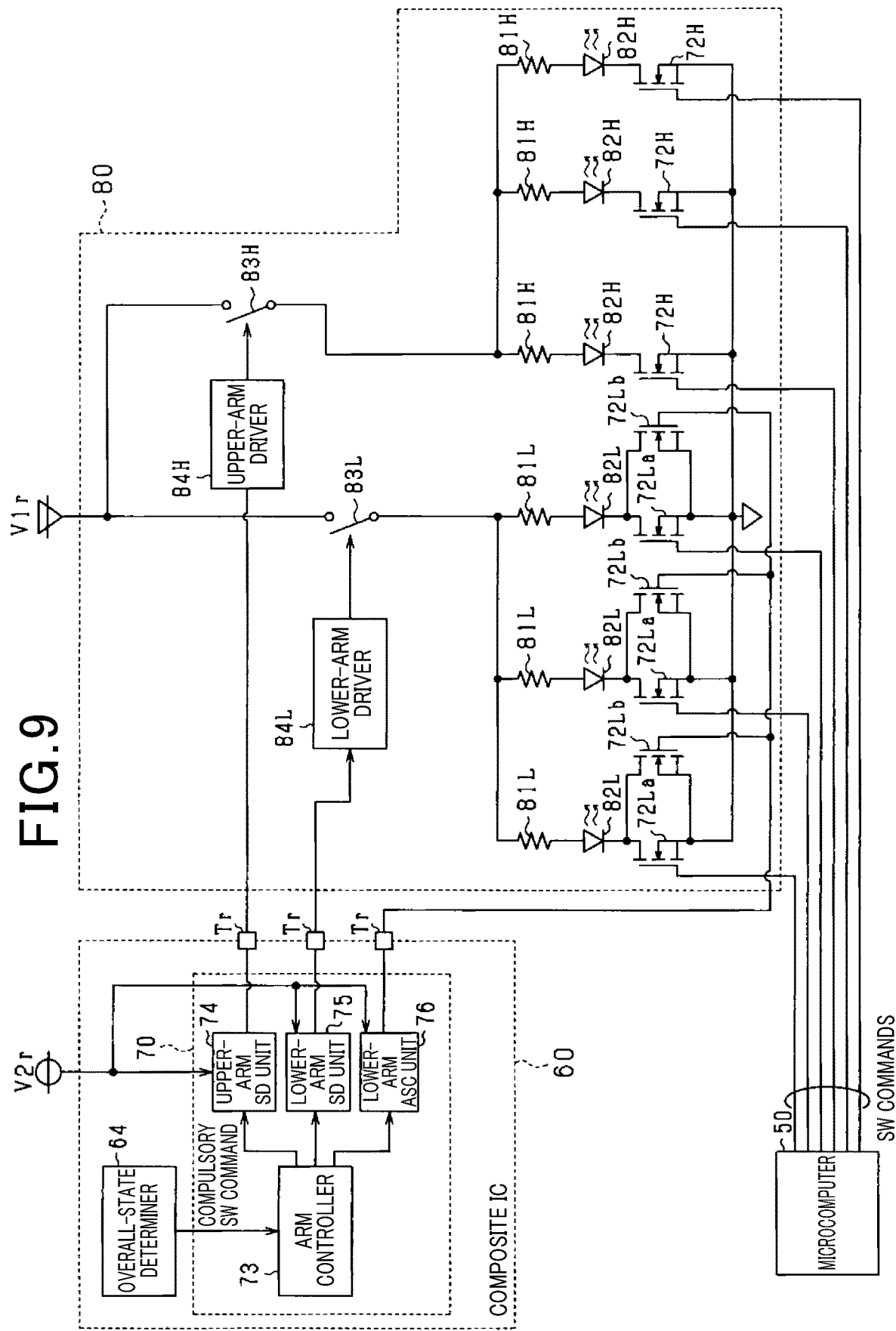
FIG. 9 is a schematic diagram illustrating the configuration of a composite IC and a first isolation transmitter of the control circuit according to the second embodiment.

FIG. 8 shows the configuration of the control circuit 30 according to the second embodiment. FIG. 9 shows both the configuration of the switch controller 70 and the configuration of the photodiode-side part of the first isolation transmitter 80 according to the second embodiment.

As shown in FIG. 9, in the present embodiment, the switch controller 70 includes an arm controller 73, an upper-arm SD unit 74, a lower-arm SD unit 75 and a lower-arm ASC unit 76, all of which are driven by the second output voltage V2r of the low-voltage power supply circuit 40 supplied thereto.

Moreover, in the present embodiment, the high switches 72H and the low switches 72L are provided in the first isolation transmitter 80, not in the switch controller 70 as in the first embodiment.

Furthermore, in the present embodiment, each of the low switches 72L consists of a first low switch 72La and a second low switch 72Lb that are electrically connected in parallel to each other. In addition, each of the first and second low switches 72La and 72Lb is configured with an N-channel MOSFET.

Moreover, in the present embodiment, the first isolation transmitter 80 further includes a first switch 83H, an upper-arm driver 84H, a second switch 83L and a lower-arm driver 84L.

In the present embodiment, the arm controller 73 of the switch controller 70 determines whether the compulsory switching command has been inputted thereto from the overall-state determiner 64. Moreover, when it is determined that no compulsory switching command has been inputted thereto, the arm controller 73 outputs an ON command to each of the upper-arm SD unit 74 and the lower-arm SD unit 75 and an OFF command to the lower-arm ASC unit 76.

Then, the upper-arm SD unit 74 outputs the inputted ON command to the upper-arm driver 84H of the first isolation transmitter 80 via a first one of three terminals Tr of the composite IC 60. The lower-arm SD unit 75 outputs the inputted ON command to the lower-arm driver 84L of the first isolation transmitter 80 via a second one of the three terminals Tr of the composite IC 60. The lower-arm ASC unit 76 outputs the inputted OFF command to each of the gates of the second low switches 72Lb of the first isolation transmitter 80 via a third one of the three terminals Tr of the composite IC 60. In addition, the switching commands from the microcomputer 50 are respectively inputted to the gates of the first low switches 72La and the high switches 72H.

Upon receipt of the ON command, the upper-arm driver 84H turns on the first switch 83H, thereby energizing the upper-arm photodiodes 82H. Consequently, the switching commands from the microcomputer 50 for controlling switching of the upper-arm switches SWH of the inverter 20 are transmitted to the drive circuit unit 90 via the first isolation transmitter 80. Moreover, upon receipt of the ON command, the lower-arm driver 84L turns on the second switch 83L, thereby energizing the lower-arm photodiodes 82L. Consequently, the switching commands from the microcomputer 50 for controlling switching of the lower-arm switches SWL of the inverter 20 are transmitted to the drive circuit unit 90 via the first isolation transmitter 80.

On the other hand, when it is determined that the shutdown command has been inputted thereto as the compulsory switching command, the arm controller 73 outputs an OFF command to each of the upper-arm SD unit 74, the lower-arm SD unit 75 and the lower-arm ASC unit 76.

Upon receipt of the OFF command from the upper-arm SD unit 74 via the first terminal Tr of the composite IC 60, the upper-arm driver 84H turns off the first switch 83H, thereby terminating the energization of the upper-arm photodiodes 82H. Consequently, all of the upper-arm switches SWH of the inverter 20 are turned or kept off. Moreover, upon receipt of the OFF command from the lower-arm SD unit 75 via the second terminal Tr of the composite IC 60, the lower-arm driver 84L turns off the second switch 83L, thereby terminating the energization of the lower-arm photodiodes 82L. Consequently, all of the lower-arm switches SWL of the inverter 20 are turned or kept off. As a result, the shutdown control is performed.

In contrast, when it is determined that the ASC command has been inputted thereto as the compulsory switching command, the arm controller 73 outputs an OFF command to the upper-arm SD unit 74 and an ON command to each of the lower-arm SD unit 75 and the lower-arm ASC unit 76.

Upon receipt of the OFF command from the upper-arm SD unit 74 via the first terminal Tr of the composite IC 60, the upper-arm driver 84H turns off the first switch 83H, thereby terminating the energization of the upper-arm photodiodes 82H. Consequently, all of the upper-arm switches SWH of the inverter 20 are turned or kept off. Moreover, upon receipt of the ON command from the lower-arm SD unit 75 via the second terminal Tr of the composite IC 60, the lower-arm driver 84L keeps the second switch 83L on, thereby allowing the lower-arm photodiodes 82L to be continuously energized. Furthermore, upon input of the ON command from the lower-arm ASC unit 76 to the gates of the second low switches 72Lb via the third terminal Tr of the composite IC 60, the second low switches 72Lb are turned on. Consequently, all of the lower-arm switches SWL of the inverter 20 are turned or kept on. As a result, the ASC control is performed.

According to the present embodiment, it is also possible to achieve the same advantageous effects as described in the first embodiment.

Moreover, according to the present embodiment, it becomes possible to reduce the number of the terminals Tr of the composite IC 60 from six to three.

Third Embodiment

Figure 10:
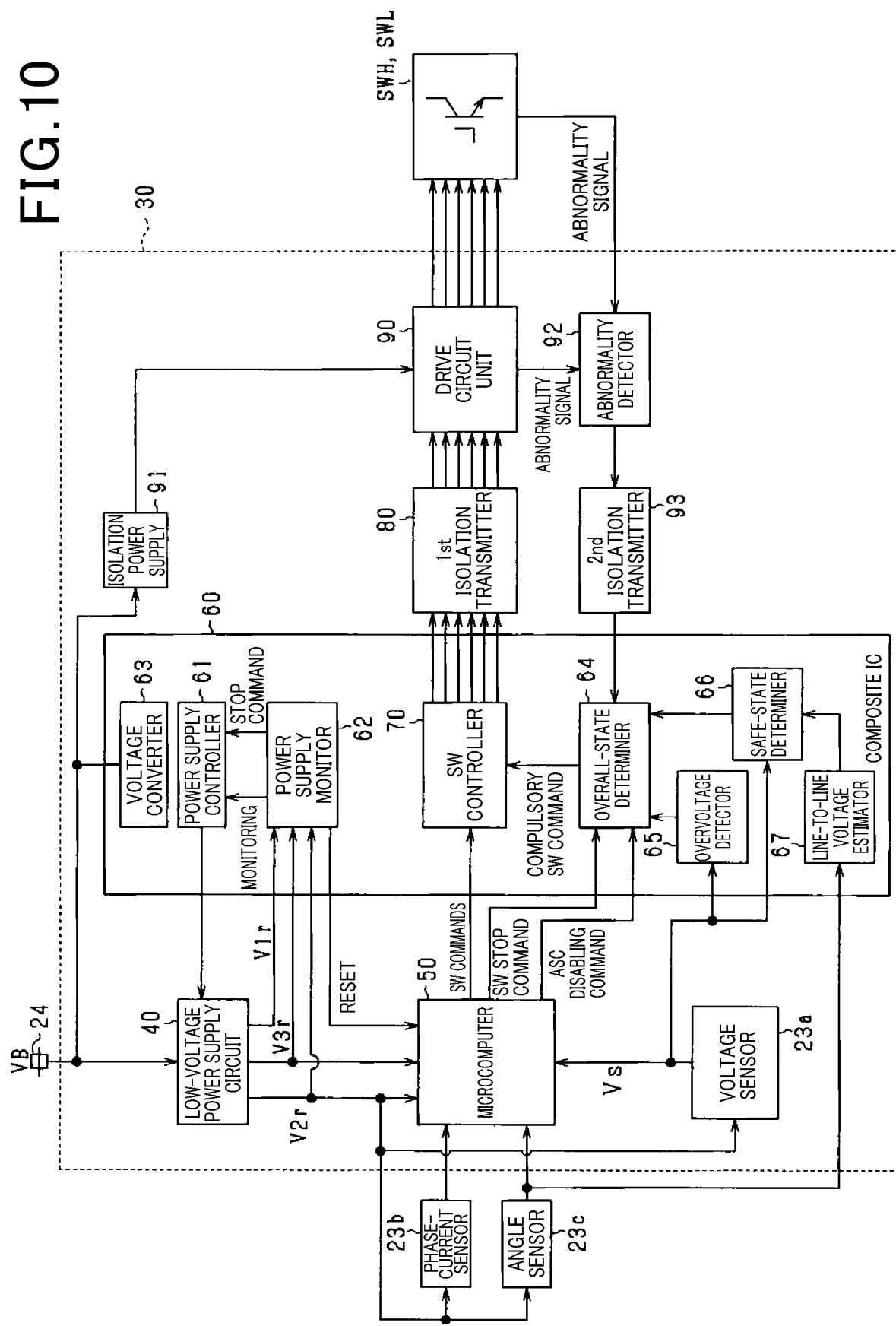
FIG. 10 is a schematic diagram illustrating the configuration of a control circuit according to a third embodiment.

A control circuit 30 according to the third embodiment has a similar configuration to the control circuit 30 according to the first embodiment. Therefore, the differences therebetween will be mainly described hereinafter. FIG. 10 shows the configuration of the control circuit 30 according to the third embodiment.

As shown in FIG. 10, in the present embodiment, the composite IC 60 further includes a line-to-line voltage estimator 67 to which is inputted the angle signal outputted from the angle sensor 23c.

The line-to-line voltage estimator 67 calculates, based on the inputted angle signal, the rotational speed Nm of the rotor of the rotating electric machine 10. Then, based on the calculated rotational speed Nm and using the equation "Vc=K×Nm", the line-to-line voltage estimator 67 estimates the line-to-line voltage Vc between the phase windings 11 of the rotating electric machine 10 when a counterelectromotive force is generated in the phase windings 11. Here, K is a coefficient that depends on the amount of magnetic flux φ generated by magnetic poles of the rotor.

Alternatively, the line-to-line voltage estimator 67 may estimate the line-to-line voltage Vc on the basis of the electrical angular speed ωe instead of the rotational speed Nm of the rotor.

The line-to-line voltage Vc estimated by the line-to-line voltage estimator 67 is inputted to the safe-state determiner 66. Then, based on the line-to-line voltage Vc and the power source voltage VDC, the safe-state determiner 66 determines the content of the compulsory switching command to be outputted from the overall-state determiner 64.

Figure 11:
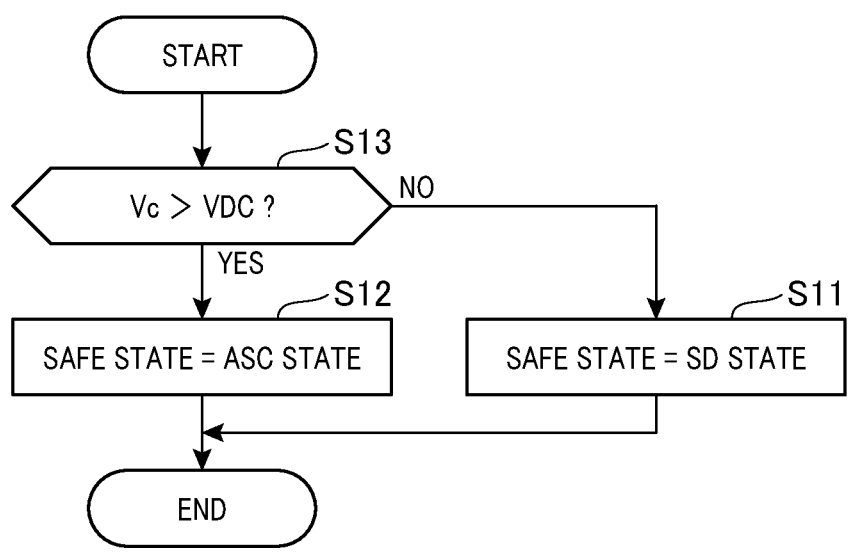
FIG. 11 is a flow chart illustrating a safe-state determination process performed by a safe-state determiner of the control circuit according to the third embodiment.

FIG. 11 shows a safe-state determination process performed by the safe-state determiner 66 according to the present embodiment. In addition, this process is repeatedly performed in a predetermined cycle by the safe-state determiner 66.

In step S13, the safe-state determiner 66 determines whether the line-to-line voltage Vc estimated by the line-to-line voltage estimator 67 is higher than the power source voltage VDC calculated based on the voltage signal Vs outputted from the voltage sensor 23a. In addition, this determination is made for determining whether regeneration is being performed.

If the determination in step S13 results in a "NO" answer, i.e., if the line-to-line voltage Vc is not higher than the power source voltage VDC, the process proceeds to step S11.

In step S11, the safe-state determiner 66 determines that no regeneration is being performed. Then, the safe-state determiner 66 determines that when it is determined in step S20 of FIG. 5 that at least one of the abnormalities has occurred, the rotating electric machine control system can be brought into a safe state (i.e., shutdown state) by setting the compulsory switching command, which is to be outputted from the overall-state determiner 64, to the shutdown (abbreviated to SD in FIG. 11) command. Thereafter, the process terminates.

On the other hand, if the determination in step S13 results in a "YES" answer, i.e., if the line-to-line voltage Vc is higher than the power source voltage VDC, the process proceeds to step S12.

In step S12, the safe-state determiner 66 determines that regeneration is being performed. Then, the safe-state determiner 66 determines that when it is determined in step S20 of FIG. 5 that at least one of the abnormalities has occurred, the rotating electric machine control system can be brought into a safe state (i.e., all-phase short circuit state) by setting the compulsory switching command, which is to be outputted from the overall-state determiner 64, to the ASC command. Thereafter, the process terminates.

In addition, the results of the determinations made by the safe-state determiner 66 in steps S11 and S12 of the above process are inputted to the overall-state determiner 64.

As above, in the present embodiment, the line-to-line voltage Vc estimated by the line-to-line voltage estimator 67 is compared with the power source voltage VDC that is calculated based on the voltage signal Vs outputted from the voltage sensor 23a. Consequently, it becomes possible to accurately determine whether the line-to-line voltage Vc between the phase windings 11 of the rotating electric machine 10 when a counterelectromotive force is generated in the phase windings 11 is higher than the terminal voltage of the storage battery 21. As a result, it becomes possible to suppress electric current from flowing in the phase windings 11, thereby suppressing increase in the temperature of the rotating electric machine 10.

In the present embodiment, when the line-to-line voltage Vc estimated based on the rotational speed Nm of the rotor is determined to be higher than the power source voltage VDC, it is determined that the line-to-line voltage Vc when a counterelectromotive force is generated in the phase windings 11 of the rotating electric machine 10 is higher than the terminal voltage of the storage battery 21. Moreover, when the line-to-line voltage Vc is determined to be higher than the terminal voltage of the storage battery 21, it is determined that the rotating electric machine control system can be brought into a safe state (i.e., all-phase short circuit state) by setting the compulsory switching command, which is to be outputted from the overall-state determiner 64, to the ASC command. In contrast, when the line-to-line voltage Vc is determined to be not higher than the terminal voltage of the storage battery 21, it is determined that the rotating electric machine control system can be brought into a safe state (i.e., shutdown state) by setting the compulsory switching command to the shutdown command.

It should be noted that in the present embodiment, the estimation of the line-to-line voltage Vc is made based on the rotational speed Nm of the rotor for the purpose of preventing the torque (or braking torque) generated by the rotating electric machine 10 from becoming high during occurrence of an abnormality.

When the ASC control is performed, electric current flows within the phase windings 11 of the rotating electric machine 10 and the inverter 20, thereby preventing regeneration, in which electric current flows to the storage battery 21 side, from being performed. In this case, since electric current flows through the phase windings 11 of the rotating electric machine 10, torque is generated by the rotating electric machine 10. The generated torque increases with the absolute value of the q-axis current Iq. Moreover, as can be seen from the following equations for determining the d-axis current Id and the q-axis current Iq, the absolute value of the q-axis current Iq increases with decrease in the electrical angular speed we (or the rotational speed Nm of the rotor). This is because the resistance component increases with decrease in the rotational speed Nm of the rotor. The following equations can be derived by substituting Vd=0 and Vq=0 into well-known voltage equations, where Vd is the d-axis voltage and Vq is the q-axis voltage. In addition, both Vd and Vq are set to zero because all of the lower-arm switches SWL of the inverter 20 are turned on in the ASC control.

$$I_d = -\frac{\omega_e^2 L_q \phi}{R^2 + \omega_e^2 L_d L_q}, I_q = -\frac{R}{\omega_e L_q} I_d$$

Figure 12A:
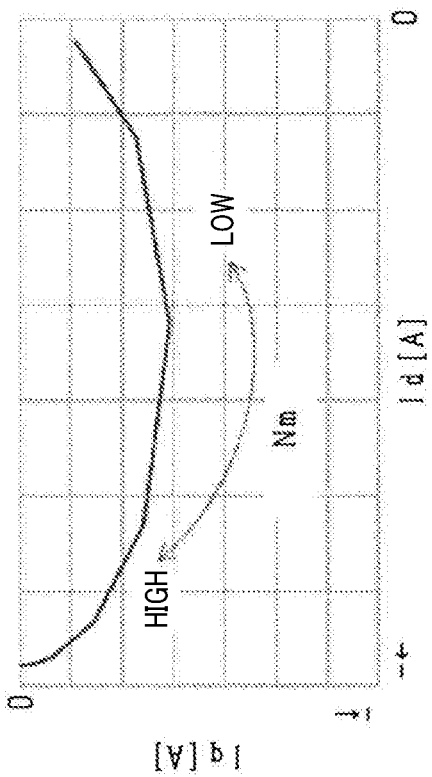
FIG. 12A is a graph illustrating the relationship between the rotational speed of a rotor and d-axis and q-axis currents in a rotating electric machine when an ASC control is performed by the control circuit according to the third embodiment.
Figure 12B:
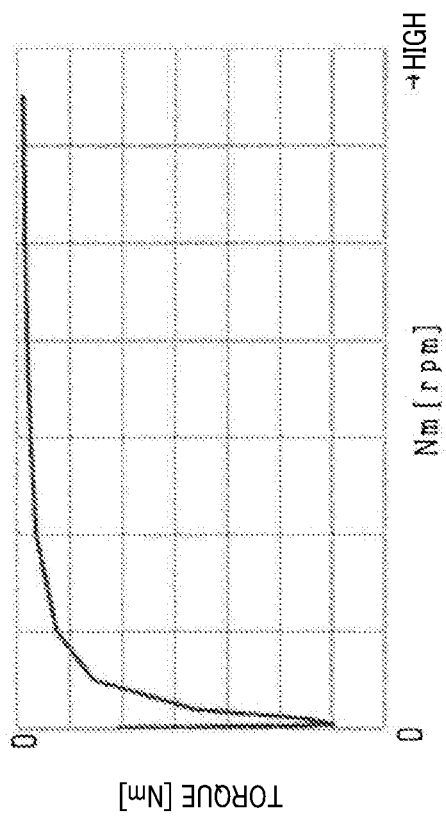
FIG. 12B is a graph illustrating the relationship between the rotational speed of the rotor and the phase-current amplitude in the rotating electric machine when the ASC control is performed by the control circuit according to the third embodiment.
Figure 12C:
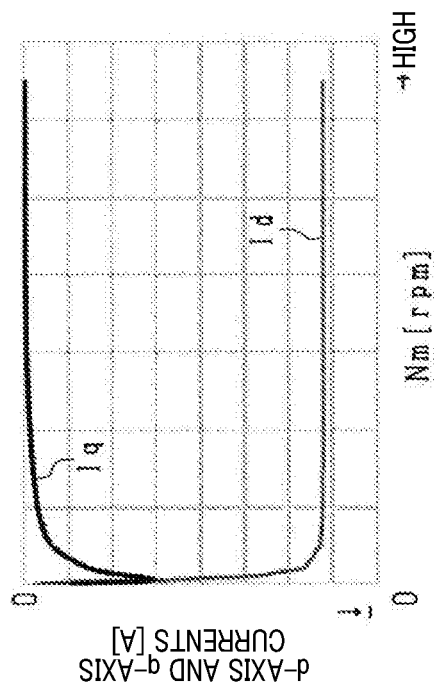
FIG. 12C is a graph illustrating the relationship between the d-axis current and the q-axis current in the rotating electric machine when the ASC control is performed by the control circuit according to the third embodiment.
Figure 12D:
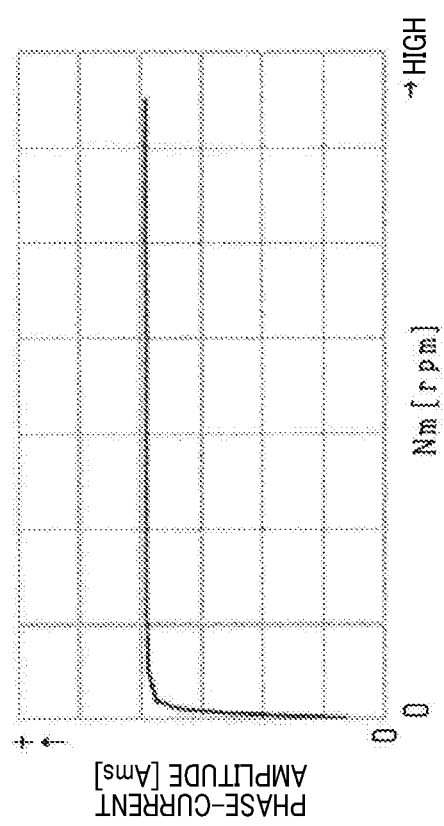
FIG. 12D is a graph illustrating the relationship between the rotational speed of the rotor and torque generated by the rotating electric machine when the ASC control is performed by the control circuit according to the third embodiment.

FIGS. 12A-12D show the relationships between various parameters when the ASC control is performed. Specifically, FIG. 12A shows the relationship between the rotational speed Nm of the rotor and the d-axis and q-axis currents Id and Iq. FIG. 12B shows the relationship between the rotational speed Nm of the rotor and the phase-current amplitude. FIG. 12C shows the relationship between the d-axis current Id and the q-axis current Iq. FIG. 12D shows the relationship between the rotational speed Nm of the rotor and the torque generated by the rotating electric machine 10.

As shown in FIG. 12A, when the rotational speed Nm of the rotor is low, the absolute value of the q-axis current Iq is small. However, when the rotational speed Nm of the rotor drops below a given rotational speed, the absolute value of the q-axis current Iq turns to increase. Consequently, as shown in FIG. 12D, in a low-rotational speed region where the rotational speed Nm of the rotor is lower than the given rotational speed, the braking torque generated by the rotating electric machine 10 increases with decrease in the rotational speed Nm. The increase in the braking torque may cause sudden deceleration of the vehicle. Therefore, in the low-rotational speed region, it is desirable to perform the shutdown control, not the ASC control.

In the case of determining whether regeneration is being performed on the basis of comparison between the power source voltage VDC and the predetermined voltage Vgmth (see step S10 of FIG. 4), it may be erroneously determined in the low-rotational speed region that regeneration is being performed. For example, the rotational speed Nm of the rotor may drop into the low-rotational speed region with the terminal voltage of the smoothing capacitor 22 remaining high. In this case, though the rotational speed Nm of the rotor has dropped, the change in the amount of electric charge stored in the smoothing capacitor 22 is small. Consequently, though the rotational speed Nm of the rotor falls within the low-rotational speed region, the power source voltage VDC would be determined by the safe-state determiner 66 to be higher than the predetermined voltage Vgmth; thus it would be determined by the safe-state determiner 66 that the rotating electric machine control system can be brought into a safe state by setting the compulsory switching command to the ASC command. Hence, upon the determination in step S22 of FIG. 5 resulting in a "YES" answer, the ASC control would be performed in the low-rotational speed region. As a result, the braking torque generated by the rotating electric machine 10 would be increased, which may cause sudden deceleration of the vehicle.

In contrast, in the present embodiment, the line-to-line voltage Vc is estimated based on the rotational speed Nm of the rotor; thus the amplitude of the estimated line-to-line voltage Vc increases with the rotational speed Nm of the rotor. Therefore, when the estimated line-to-line voltage Vc is determined to be higher than the power source voltage VDC, the rotational speed Nm of the rotor would be definitely higher than the given rotational speed and thus definitely fall outside the low-rotational speed region. That is, in the present embodiment, the line-to-line voltage Vc estimated in the low-rotational speed region would be definitely lower than the minimum value in the range within which the power source voltage VDC varies during normal operation of the storage battery 21. Hence, according to the present embodiment, it is possible to reliably prevent the ASC control from being performed in the low-rotational speed region, thereby reliably preventing sudden deceleration of the vehicle.

In addition, in the present embodiment, though the shutdown control is performed in the low-rotational speed region, it would not cause any problems because regeneration is not performed when the line-to-line voltage Vc is not higher than the terminal voltage of the storage battery 21.

Modifications of Third Embodiment

In step S13 of FIG. 11, the predetermined voltage Vgmth, which is used in step S10 of FIG. 4, may be used instead of the power source voltage VDC. In this case, it is still possible to prevent the ASC control from being performed in the low-rotational speed region.

The line-to-line voltage Vc may be estimated based on both the rotational speed Nm of the rotor and the temperature of the rotor detected by a temperature sensor or estimated by a temperature estimator.

The control circuit 30 may further include an angle information converter that converts the angle signal outputted from the angle sensor 23c into angle information. In this case, the angle information converter may be built in either the microcomputer 50 or the composite IC 60, or provided as a dedicated IC (Integrated Circuit).

Instead of the angle sensor 23c, a rotational speed sensor may be employed which detects the rotational speed (i.e., the mechanical angular speed) of the rotor of the rotating electric machine 10.

The rotating electric machine control system may further include a voltage sensor that detects the line-to-line voltage Vc between the phase windings 11 of the rotating electric machine 10. In this case, in step S13 of FIG. 11, the line-to-line voltage Vc detected by the voltage sensor is used instead of the estimated line-to-line voltage Vc.

Fourth Embodiment

A control circuit 30 according to the fourth embodiment has a similar configuration to the control circuit 30 according to the first embodiment. Therefore, the differences therebetween will be mainly described hereinafter.

Figure 13:
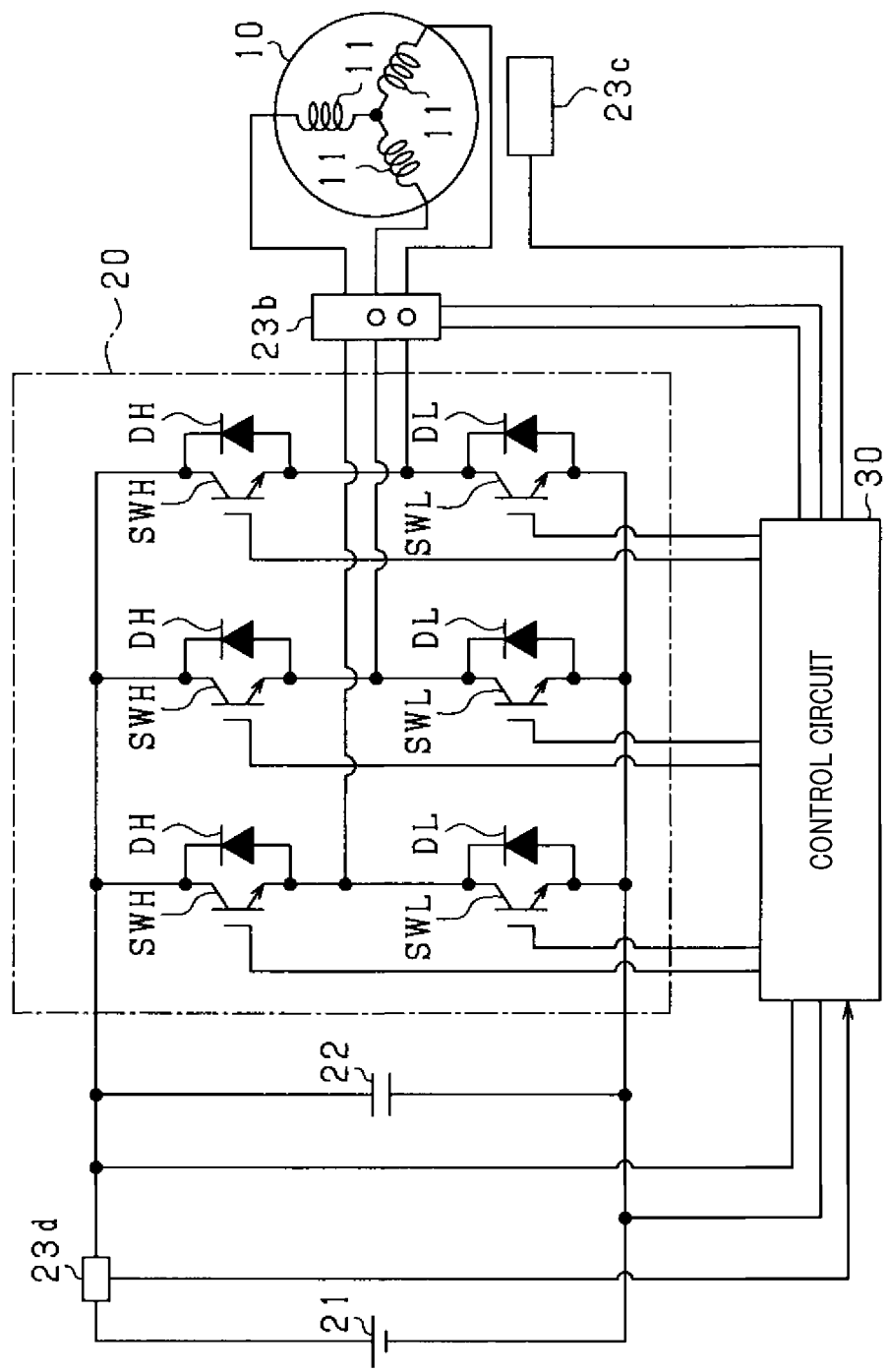
FIG. 13 is a schematic diagram illustrating the overall configuration of a rotating electric machine control system which includes a control circuit according to a fourth embodiment.

In the present embodiment, as shown in FIG. 13, the rotating electric machine control system further includes an input current sensor 23d that is configured to detect electric current flowing from the inverter 20 to the storage battery 21 side and output a current signal indicative of the detected electric current.

Figure 14:
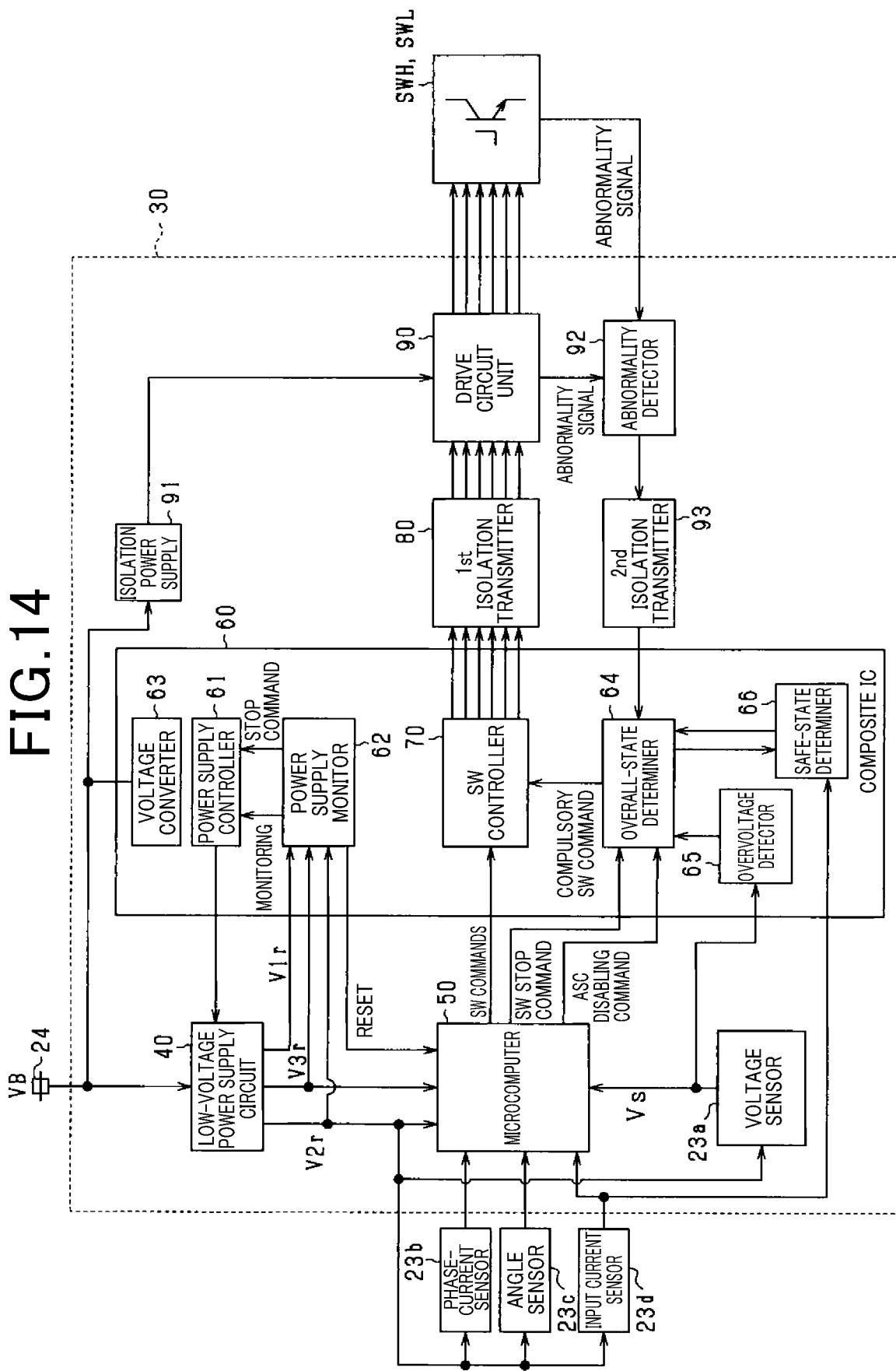
FIG. 14 is a schematic diagram illustrating the configuration of the control circuit according to the fourth embodiment.

FIG. 14 shows the configuration of the control circuit 30 according to the present embodiment.

As shown in FIG. 14, in the present embodiment, to the input current sensor 23d, there is supplied the second output voltage V2r of the low-voltage power supply circuit 40. The current signal outputted from the input current sensor 23d is inputted to the microcomputer 50. Then, based on the inputted current signal, the microcomputer 50 calculates the electric current flowing from the inverter 20 to the storage battery 21 side.

Moreover, in the present embodiment, instead of the voltage signal Vs outputted from the voltage sensor 23a, the current signal outputted from the input current sensor 23d is inputted to the safe-state determiner 66. In addition, to the safe-state determiner 66, there is also inputted from the overall-state determiner 64 information on the switching state of each of the upper-arm and lower-arm switches SWH and SWL of the inverter 20.

In the present embodiment, the safe-state determiner 66 determines a safe state of the rotating electric machine control system on the basis of the current signal outputted from the input current sensor 23d.

Figure 15:
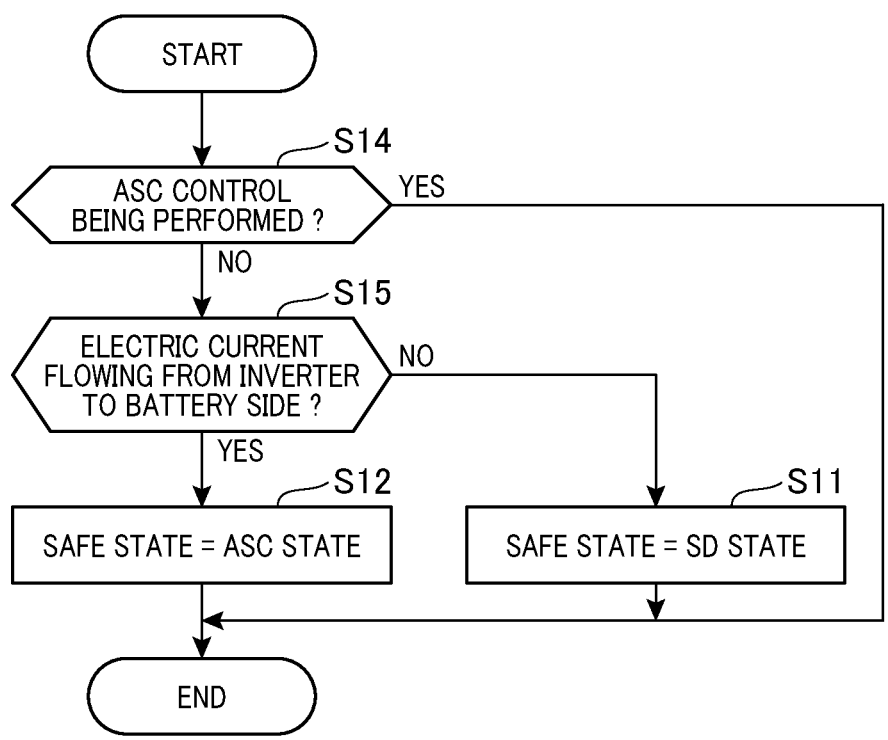
FIG. 15 is a flow chart illustrating a safe-state determination process performed by a safe-state determiner of the control circuit according to the fourth embodiment.

FIG. 15 shows a safe-state determination process performed by the safe-state determiner 66 according to the present embodiment. In addition, this process is repeatedly performed in a predetermined cycle by the safe-state determiner 66.

In step S14, the safe-state determiner 66 determines whether the ASC control is being performed.

If the determination in step S14 results in a "YES" answer, the process immediately terminates without performing the subsequent steps.

In contrast, if the determination in step S14 results in a "NO" answer, the process proceeds to step S15.

In step S15, the safe-state determiner 66 determines that the shutdown control is being performed. Then, the safe-state determiner 66 further determines, based on the current signal outputted from the input current sensor 23d, whether electric current is flowing from the inverter 20 to the storage battery 21 side.

In addition, when the counterelectromotive force generated in the phase windings 11 of the rotating electric machine 10 exceeds the terminal voltage of the storage battery 21 during the execution of the shutdown control, regenerative current flows from the inverter 20 to the storage battery 21 side.

If the determination in step S15 results in a "NO" answer, the process proceeds to step S11.

In step S11, the safe-state determiner 66 determines that no regeneration is being performed. Then, the safe-state determiner 66 determines that the shutdown state is currently a safe state of the rotating electric machine control system. Thereafter, the process terminates.

On the other hand, if the determination in step S15 results in a "YES" answer, the process proceeds to step S12.

In step S12, the safe-state determiner 66 determines that regeneration is being performed. Then, the safe-state determiner 66 determines that the rotating electric machine control system can be brought into a safe state (i.e., all-phase short circuit state) by setting the compulsory switching command, which is to be outputted from the overall-state determiner 64, to the ASC command. Thereafter, the process terminates.

In addition, the results of the determinations made by the safe-state determiner 66 in steps S11 and S12 of the above process are inputted to the overall-state determiner 64.

According to the present embodiment, it is also possible to achieve the same advantageous effects as described in the first embodiment.

Moreover, according to the present embodiment, it becomes possible to accurately determine whether regeneration is being performed. Consequently, it becomes possible to reduce chances of the ASC control being performed during occurrence of an abnormality. As a result, it becomes possible to suppress braking torque generated by the rotating electric machine 10 from being increased in the low-rotational speed region.

Fifth Embodiment

A control circuit 30 according to the fifth embodiment has a similar configuration to the control circuit 30 according to the second embodiment. Therefore, the differences therebetween will be mainly described hereinafter.

Figure 16:
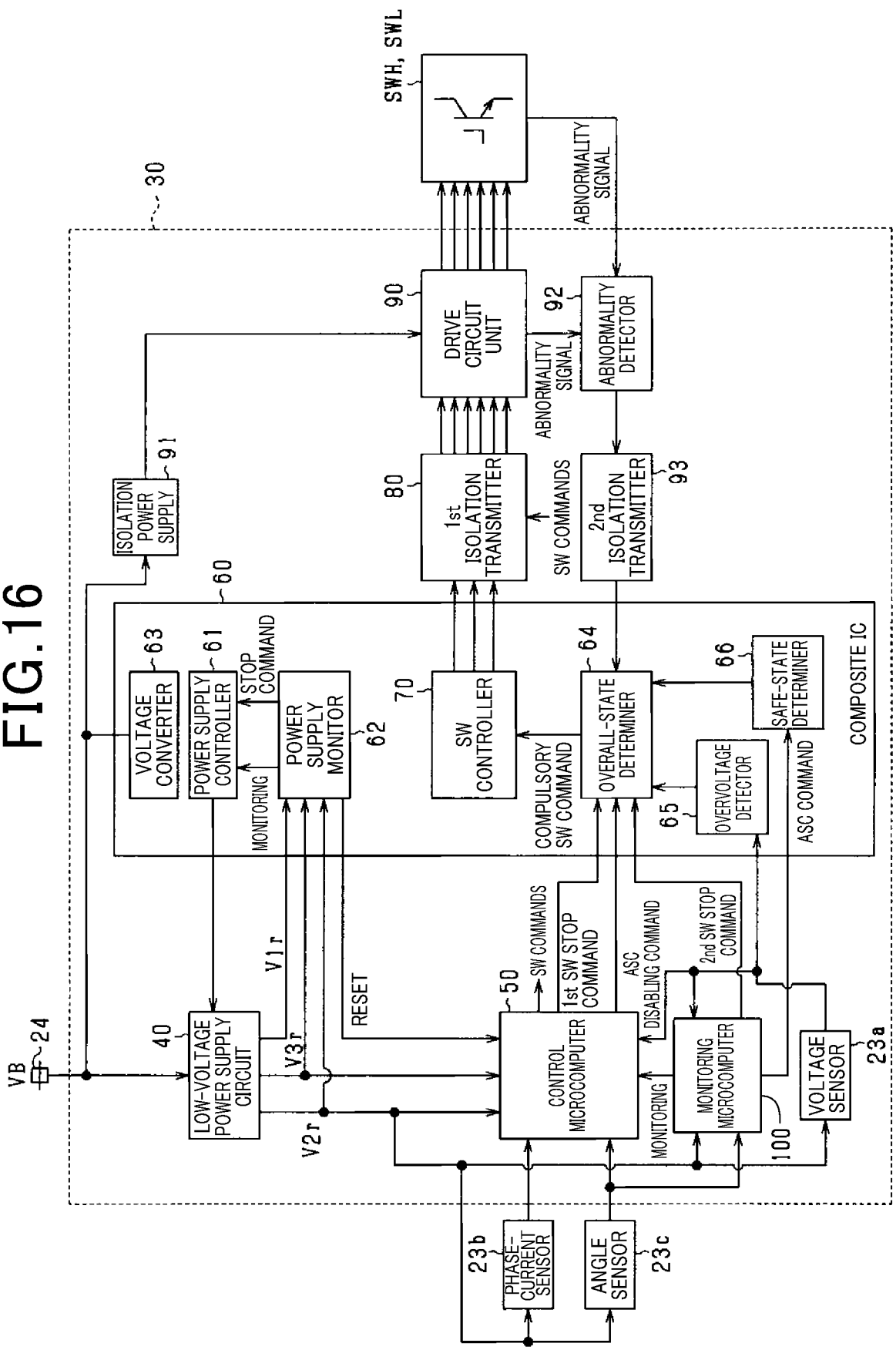
FIG. 16 is a schematic diagram illustrating the configuration of a control circuit according to a fifth embodiment.

FIG. 16 shows the configuration of the control circuit 30 according to the fifth embodiment.

As shown in FIG. 16, in the present embodiment, the control circuit 30 further includes a monitoring microcomputer 100 which corresponds to a "monitor".

Hereinafter, for the sake of convenience of explanation, the microcomputer 50 will be referred to as "control microcomputer 50". Moreover, the switching stop command outputted from the control microcomputer 50 will be referred to as "first switching stop command".

In the present embodiment, the monitoring microcomputer 100 is provided to monitor whether any abnormality has occurred in the control microcomputer 50. In addition, the monitoring method may be a well-known method such as a method using a watchdog timer.

To the monitoring microcomputer 100, there is supplied the second output voltage V2r of the low-voltage power supply circuit 40. Moreover, to the monitoring microcomputer 100, there are inputted the angle signal outputted from the angle sensor 23c and the voltage signal Vs outputted from the voltage sensor 23a.

Figure 17:
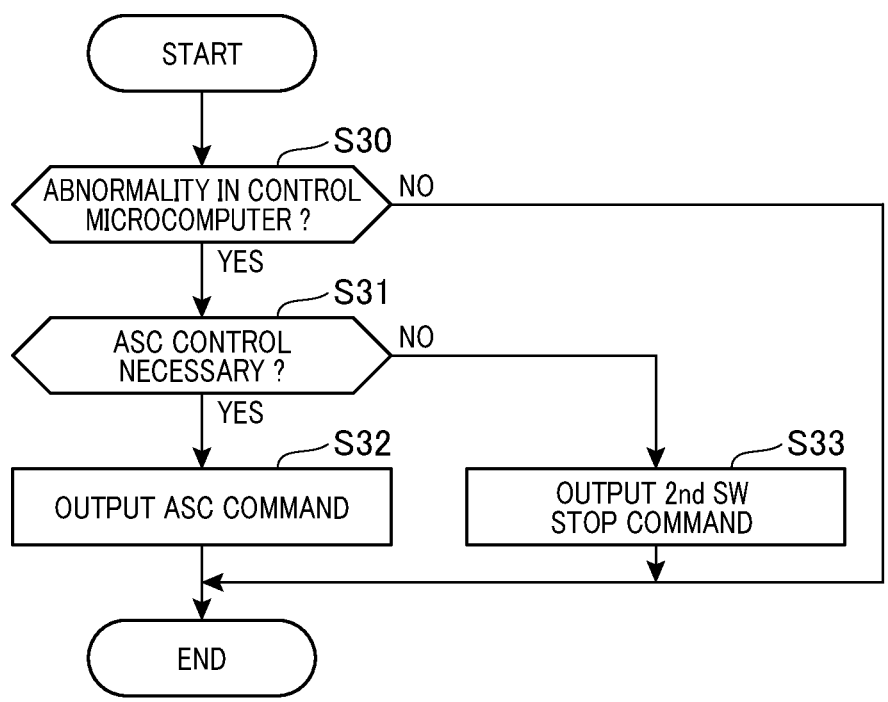
FIG. 17 is a flow chart illustrating a monitoring process performed by a monitoring microcomputer of the control circuit according to the fifth embodiment.

FIG. 17 shows a monitoring process performed by the monitoring microcomputer 100. In addition, this process is repeatedly performed in a predetermined cycle by the monitoring microcomputer 100.

In step S30, the monitoring microcomputer 100 determines whether any abnormality has occurred in the control microcomputer 50.

If the determination in step S30 results in a "NO" answer, the process immediately terminates without performing the subsequent steps.

In contrast, if the determination in step S30 results in a "YES" answer, the process proceeds to step S31.

In step S31, the monitoring microcomputer 100 further determines whether it is necessary to perform the ASC control.

Specifically, in this step, the monitoring microcomputer 100 determines whether the line-to-line voltage Vc between the phase windings 11 of the rotating electric machine 10 when a counterelectromotive force is generated in the phase windings 11 is higher than the terminal voltage of the storage battery 21. In addition, this determination may be made using the method of step S10 of FIG. 4 based on the voltage signal Vs outputted from the voltage sensor 23a. Alternatively, this determination may be made using the method of step S13 of FIG. 11 based on both the angle signal outputted from the angle sensor 23c and the voltage signal Vs outputted from the voltage sensor 23a. Moreover, in the case of the rotating electric machine control system including the input current sensor 23d, this determination may alternatively be made using the method of step S15 of FIG. 15. Furthermore, this determination may alternatively be made using a method that is a combination of at least two of the aforementioned methods.

If the determination in step S31 results in a "NO" answer, i.e., if it is unnecessary to perform the ASC control, the process proceeds to step S33.

In step S33, the monitoring microcomputer 100 outputs a second switching (abbreviated to SW in FIG. 17) stop command to the overall-state determiner 64. Thereafter, the process terminates.

In addition, the second switching stop command is outputted for the same purpose as the first switching stop command.

On the other hand, if the determination in step S31 results in a "YES" answer, i.e., if it is necessary to perform the ASC control, the process proceeds to step S32.

In step S32, the monitoring microcomputer 100 outputs an ASC command to the overall-state determiner 64 via the safe-state determiner 66. Thereafter, the process terminates.

In addition, the monitoring microcomputer 100 may output a continuous pulse signal as the ASC command. In this case, it is possible to prevent the ASC command from being accidentally transmitted to the overall-state determiner 64 due to signal sticking.

According to the present embodiment, it is also possible to achieve the same advantageous effects as described in the second embodiment.

Moreover, according to the present embodiment, when an abnormality has occurred in the control microcomputer 50, the ASC command can be outputted from the monitoring microcomputer 100, thereby causing the ASC control to be performed.

Modifications of Fifth Embodiment

Instead of the monitoring microcomputer 100, a monitoring IC may be provided in the control circuit 30 to monitor the control microcomputer.

The safe-state determiner 66 may be omitted from the composite IC 60. In this case, in step S32 of FIG. 17, the monitoring microcomputer 100 may output the ASC command directly to the overall-state determiner 64.

Step S30 may be omitted from the process shown in FIG. 17. In this case, the monitoring microcomputer 100 performs step S31 regardless of any abnormality occurring in the control microcomputer 50.

Sixth Embodiment

A control circuit 30 according to the sixth embodiment has a similar configuration to the control circuit 30 according to the second embodiment. Therefore, the differences therebetween will be mainly described hereinafter.

Figure 18:
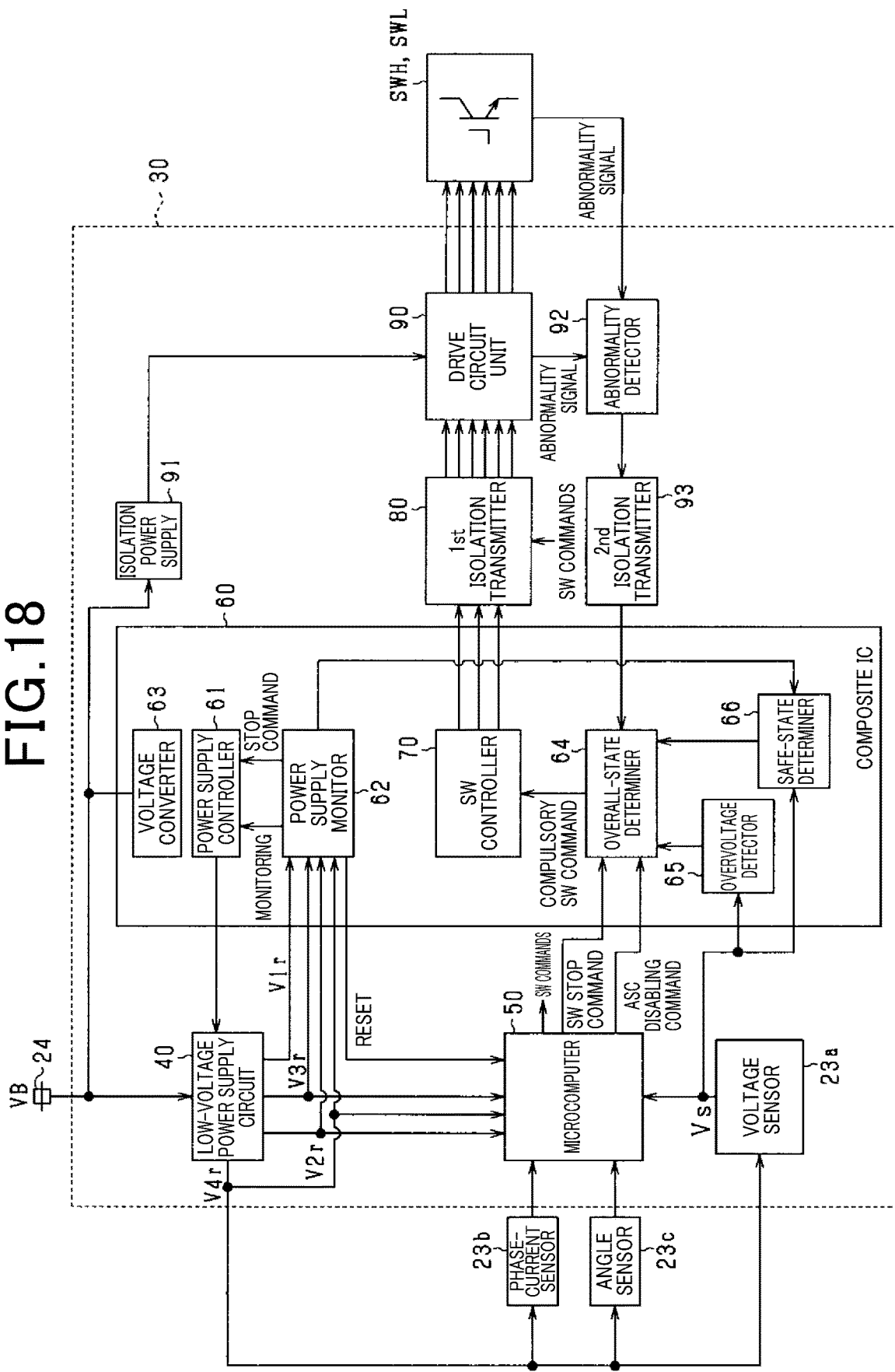
FIG. 18 is a schematic diagram illustrating the configuration of a control circuit according to a sixth embodiment.

FIG. 18 shows the configuration of the control circuit 30 according to the sixth embodiment.

As shown in FIG. 18, in the present embodiment, to the safe-state determiner 66, there are inputted the monitoring results of the power supply monitor 62.

In the present embodiment, the low-voltage power supply circuit 40 further generates, by stepping down the output voltage VB of the low-voltage DC power source 24, a fourth output voltage V4r in addition to the first, second and third output voltages V1r, V2r and V3r.

More particularly, in the present embodiment, the fourth output voltage V4r is equal to the second output voltage V2r. The divided-voltage value of the fourth output voltage V4r is inputted to the power supply monitor 62. Then, based on the inputted divided-voltage value, the power supply monitor 62 detects the fourth output voltage V4r.

Moreover, in the present embodiment, to the voltage sensor 23a, the phase-current sensor 23b and the angle sensor 23c, there is supplied the fourth output voltage V4r instead of the second output voltage V2r. On the other hand, to the microcomputer 50, there are supplied both the second and fourth output voltages V2r and V4r.

The power supply monitor 62 has a function of monitoring both the power supply controller 61 and the low-voltage power supply circuit 40. Upon determination that an abnormality has occurred in at least one of the power supply controller 61 and the low-voltage power supply circuit 40, the power supply monitor 62 notifies the safe-state determiner 66 of the occurrence of the abnormality. In addition, the power supply monitor 62 monitors the low-voltage power supply circuit 40 on the basis of the detected output voltages V1r-V4r.

In the present embodiment, the safe-state determiner 66 determines a safe state of the rotating electric machine control system on condition that no abnormality related to the output signals of the sensors 23a-23c has occurred.

In addition, "abnormalities related to the output signals of the sensors 23a-23c" denote detection accuracy degradation abnormalities such that deviations of the detected values of the physical quantities, which are detected based on the output signals of the sensors 23a-23c, from the actual values of the physical quantities are greater than predetermined thresholds. Specifically, taking the voltage signal Vs of the voltage sensor 23a as an example, the abnormality related to the voltage signal Vs denotes the detection accuracy degradation abnormality of the voltage sensor 23a such that the deviation of the power source voltage VDC detected based on the voltage signal Vs of the voltage sensor 23a from the actual terminal voltage of the smoothing capacitor 22 is greater than a predetermined threshold.

In the present embodiment, the abnormalities related to the output signals of the sensors 23a-23c include: abnormalities occurring in the low-voltage power supply circuit 40; abnormalities occurring in the sensors 23a-23c; abnormalities occurring in interfaces between the sensors 23a-23c and the microcomputer 50; abnormalities occurring in the microcomputer 50; abnormalities occurring in electrical paths connecting the low-voltage power supply circuit 40 and the sensors 23a-23c; abnormalities occurring in electrical paths connecting the sensors 23a-23c and the aforementioned interfaces; and abnormalities occurring in electrical paths connecting the aforementioned interfaces and the microcomputer 50.

Moreover, the abnormalities related to the output signals of the sensors 23a-23c also include those abnormalities which occur during the activation and shutdown of the low-voltage power supply circuit 40. This is because during the activation and shutdown of the low-voltage power supply circuit 40, the output voltages V1r-V4r of the low-voltage power supply circuit 40 become unstable, thereby lowering the accuracy of detection of the physical quantities based on the output signals of the sensors 23a-23c.

In the present embodiment, the abnormities occurring in the low-voltage power supply circuit 40 are determined as follows. When the fourth output voltage V4r of the low-voltage power supply circuit 40 drops below a first threshold VtLS, the power supply monitor 62 determines that an undervoltage abnormality has occurred in the low-voltage power supply circuit 40. Thereafter, when the fourth output voltage V4r of the low-voltage power supply circuit 40 exceeds a second threshold VtHS that is higher than the first threshold VtLS, the power supply monitor 62 determines that there is no undervoltage abnormality occurring in the low-voltage power supply circuit 40 (see FIG. 20(a)).

Figure 19:
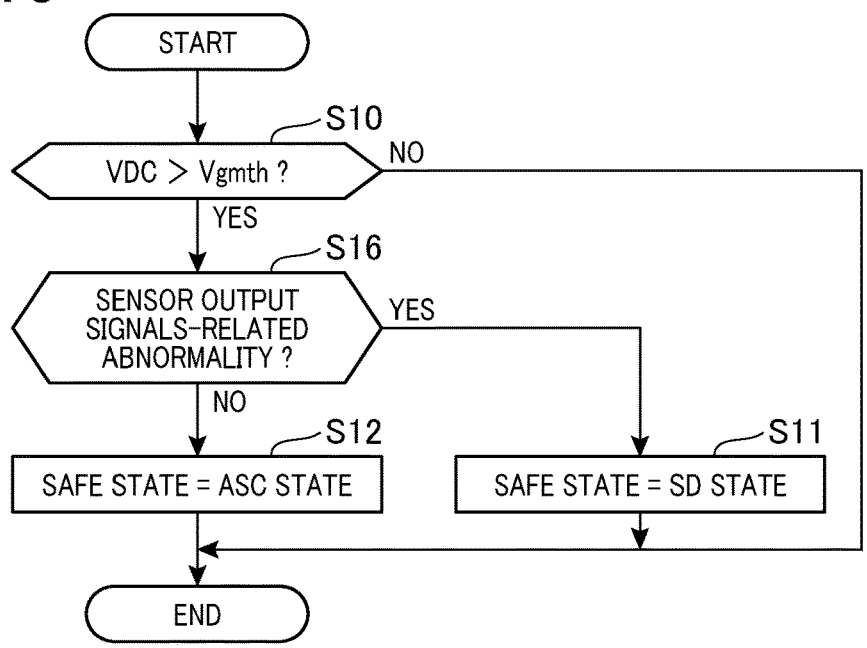
FIG. 19 is a flow chart illustrating a safe-state determination process performed by a safe-state determiner of the control circuit according to the sixth embodiment.

FIG. 19 shows a safe-state determination process performed by the safe-state determiner 66 according to the present embodiment. In addition, this process is repeatedly performed in a predetermined cycle by the safe-state determiner 66.

It should be noted that steps S10-S12 of the safe-state determination process according to the present embodiment are identical to steps S10-S12 of the safe-state determination process according to the first embodiment (see FIG. 4). Therefore, descriptions of steps S10-S12 will not be repeated hereinafter.

If the determination in step S10 results in a "YES" answer, the process proceeds to step S16.

In step S16, the safe-state determiner 66 further determines whether any abnormality related to the output signals of the sensors 23a-23c has occurred.

If the determination in step S16 results in a "NO" answer, the process proceeds to step S12.

In contrast, if the determination in step S16 results in a "YES" answer, the process proceeds to step S11. Consequently, though it has been determined in step S10 that regeneration is being performed, the safe-state determiner 66 determines in step S11 that the rotating electric machine control system can be brought into a safe state (i.e., shutdown state) by setting the compulsory switching command, which is to be outputted from the overall-state determiner 64, to the shutdown (abbreviated to SD in FIG. 19) command.

In addition, when any abnormality related to the output signals of the sensors 23a-23c has occurred so that the inverter 20 becomes unable to continue its normal operation, the switch controller 70 may stop switching of the upper-arm and lower-arm switches SWH and SWL of the inverter 20.

Figure 20:
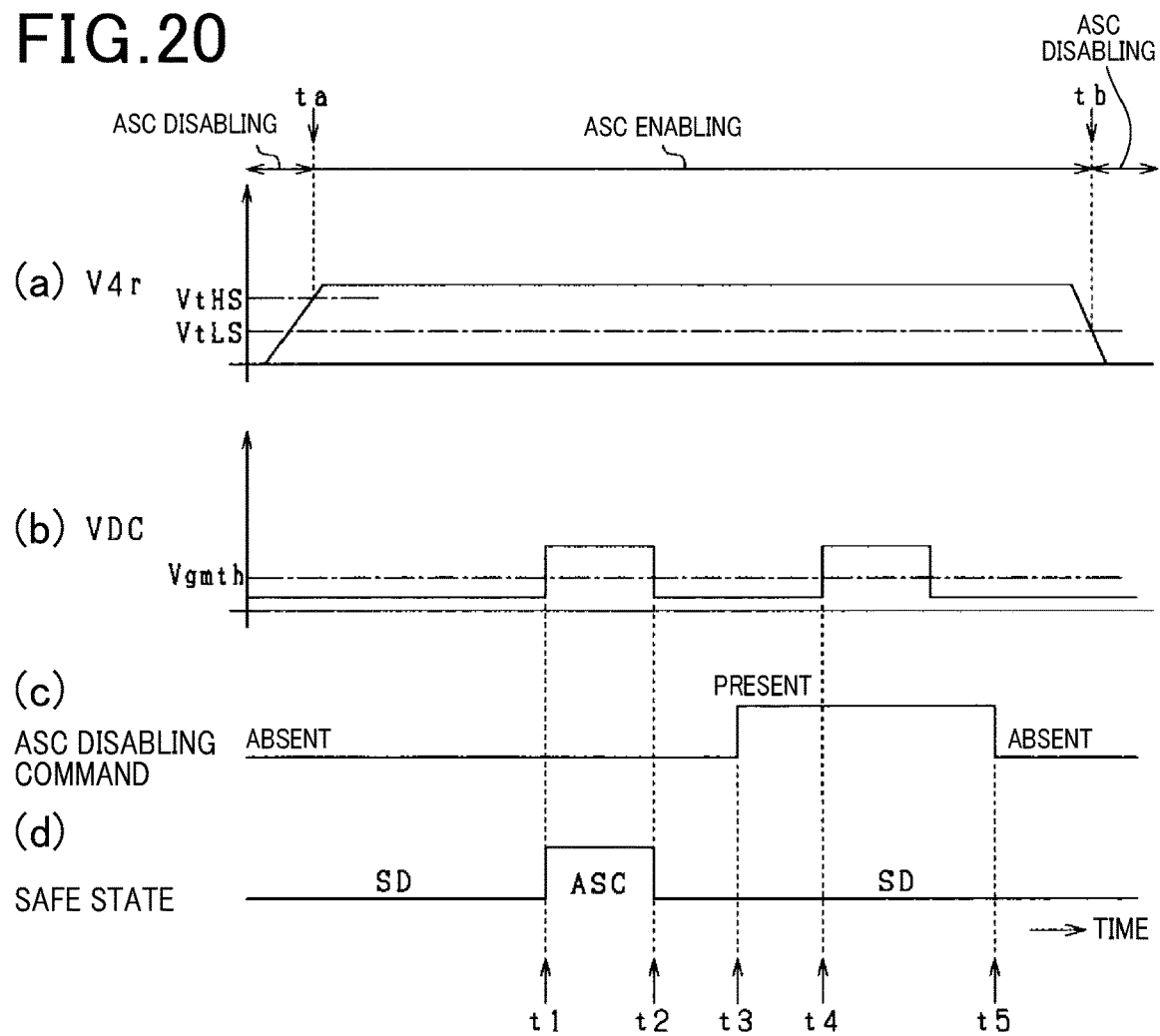
FIG. 20 is a time chart illustrating the changes with time of (a) a fourth output voltage, (b) a power source voltage, (c) the presence or absence of an ASC disabling command and (d) the content of a compulsory switching command for bringing the rotating electric machine control system into a safe state according to the sixth embodiment.

FIG. 20 illustrates the changes with time of (a) the fourth output voltage V4r of the low-voltage power supply circuit 40, (b) the power source voltage VDC, (c) the presence or absence of the ASC disabling command outputted from the microcomputer 50 and (d) the content of the compulsory switching command for bringing the rotating electric machine control system into a safe state.

It should be noted that: (b)-(d) of FIG. 20 respectively correspond to (a)-(c) of FIG. 7 described in the first embodiment; and time instants t1-t5 shown in FIG. 20 respectively correspond to the time instants t1-t5 shown in FIG. 7.

As shown in FIG. 20, at a time instant tb, it is determined by the power supply monitor 62 that the fourth output voltage V4r drops below the first threshold VtLS. That is, it is determined by the power supply monitor 62 that the undervoltage abnormality has occurred in the low-voltage power supply circuit 40. Consequently, from the time instant tb, the compulsory switching command is set to the shutdown command and thus the ASC control is not performed.

In contrast, at a time instant ta, it is determined by the power supply monitor 62 that the fourth output voltage V4r exceeds the second threshold VtHS. That is, it is determined by the power supply monitor 62 that there is no undervoltage abnormality occurring in the low-voltage power supply circuit 40. Consequently, during the time period from the time instant ta to the time instant tb, the compulsory switching command is set to either the shutdown command or the ASC command depending on both the result of the determination in step S10 of FIG. 19 and the presence or absence of the ASC disabling command outputted from the microcomputer 50. As a result, during the time period of from ta to tb, either the shutdown control or the ASC control is performed depending on both the result of the determination in step S10 of FIG. 19 and the presence or absence of the ASC disabling command outputted from the microcomputer 50.

In addition, prior to the time instant ta, the compulsory switching command is set to the shutdown command and thus the ASC control is not performed.

As described above, in the present embodiment, when any abnormality related to the output signals of the sensors 23a-23c has occurred, the safe-state determiner 66 determines that the rotating electric machine control system can be brought into a safe state (i.e., shutdown state) by setting the compulsory switching command to the shutdown command even if the line-to-line voltage Vc is determined to be higher than the terminal voltage of the storage battery 21. Consequently, the ASC control is not performed even when the determination in step S20 of FIG. 5 results in a "YES" answer. As a result, it becomes possible to prevent the ASC control from being accidentally performed in situations where the ASC control should not be performed.

Moreover, in the present embodiment, the system of supplying electric power from the low-voltage power supply circuit 40 to the sensors 23a-23c is separated from the system of supplying electric power from the low-voltage power supply circuit 40 to the microcomputer 50. Consequently, the microcomputer 50 can continue its normal operation when the fourth output voltage V4r of the low-voltage power supply circuit 40 becomes abnormal.

Modifications of Sixth Embodiment

The system of supplying electric power from the low-voltage power supply circuit 40 to the sensors 23a-23c and the system of supplying electric power from the low-voltage power supply circuit 40 to the microcomputer 50 may be integrated into a single system as shown in FIG. 2.

Specifically, the control circuit shown in FIG. 2 may be modified so that: the monitoring results of the power supply monitor 62 are inputted to the safe-state determiner 66; and the ASC control is not performed when any abnormality related to the output signals of the sensors 23a-23c has occurred. Moreover, the control circuit shown in FIG. 8 may also be modified so that: the monitoring results of the power supply monitor 62 are inputted to the safe-state determiner 66; and the ASC control is not performed when any abnormality related to the output signals of the sensors 23a-23c has occurred.

While the above particular embodiments and modifications have been shown and described, it will be understood by those skilled in the art that various further modifications, changes, and improvements may be made without departing from the spirit of the present disclosure.

Figure 21:
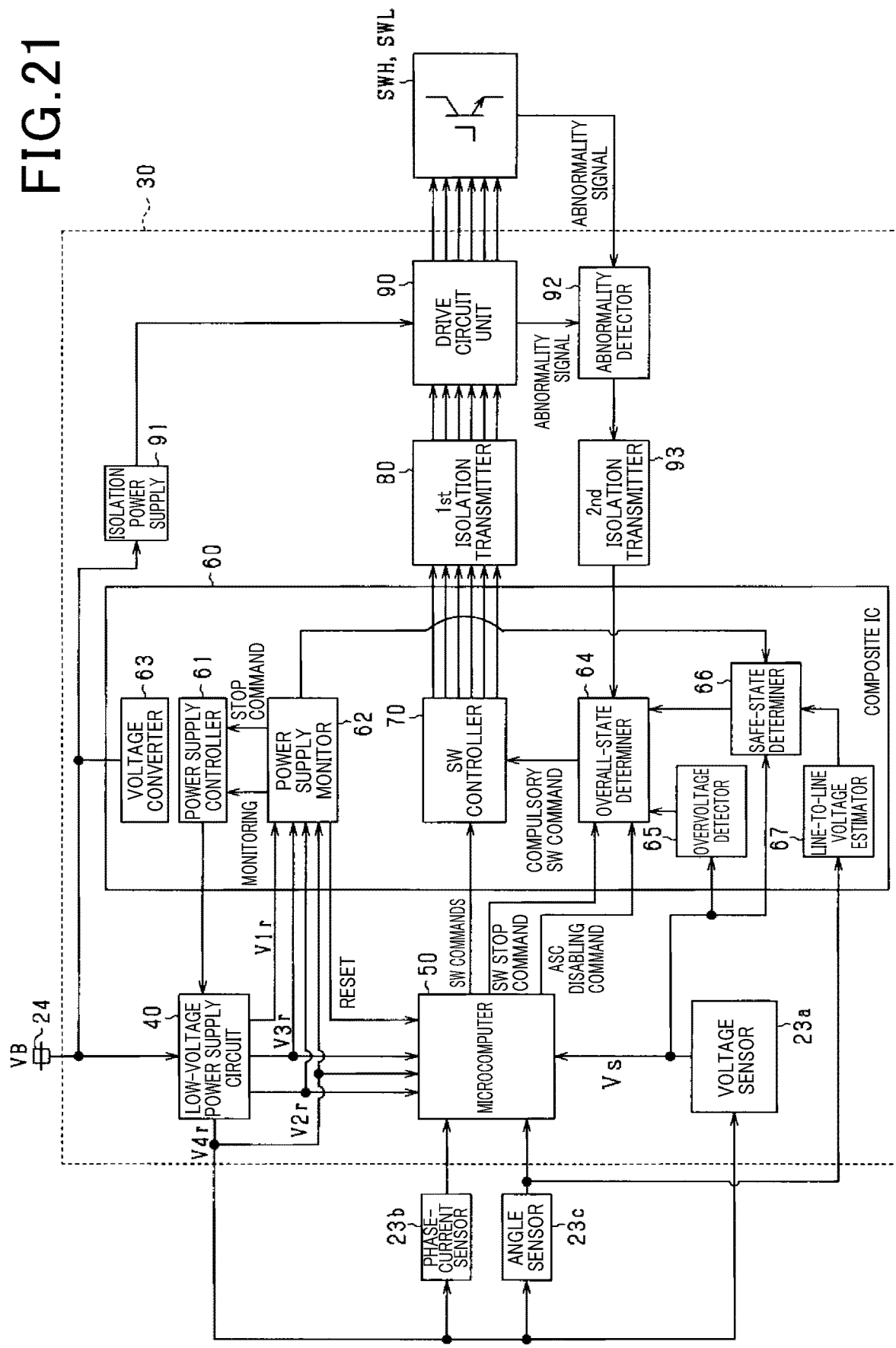
FIG. 21 is a schematic diagram illustrating the configuration of a control circuit according to one modification.

For example, FIG. 21 shows the configuration of a control circuit that is a combination of the control circuit according to the third embodiment (see FIG. 10) and the control circuit according to the sixth embodiment (see FIG. 18). In the control circuit shown in FIG. 21, the monitoring results of the power supply monitor 62 are inputted to the safe-state determiner 66; and the output voltages of the low-voltage power supply circuit 40 are divided into two systems.

Figure 22:
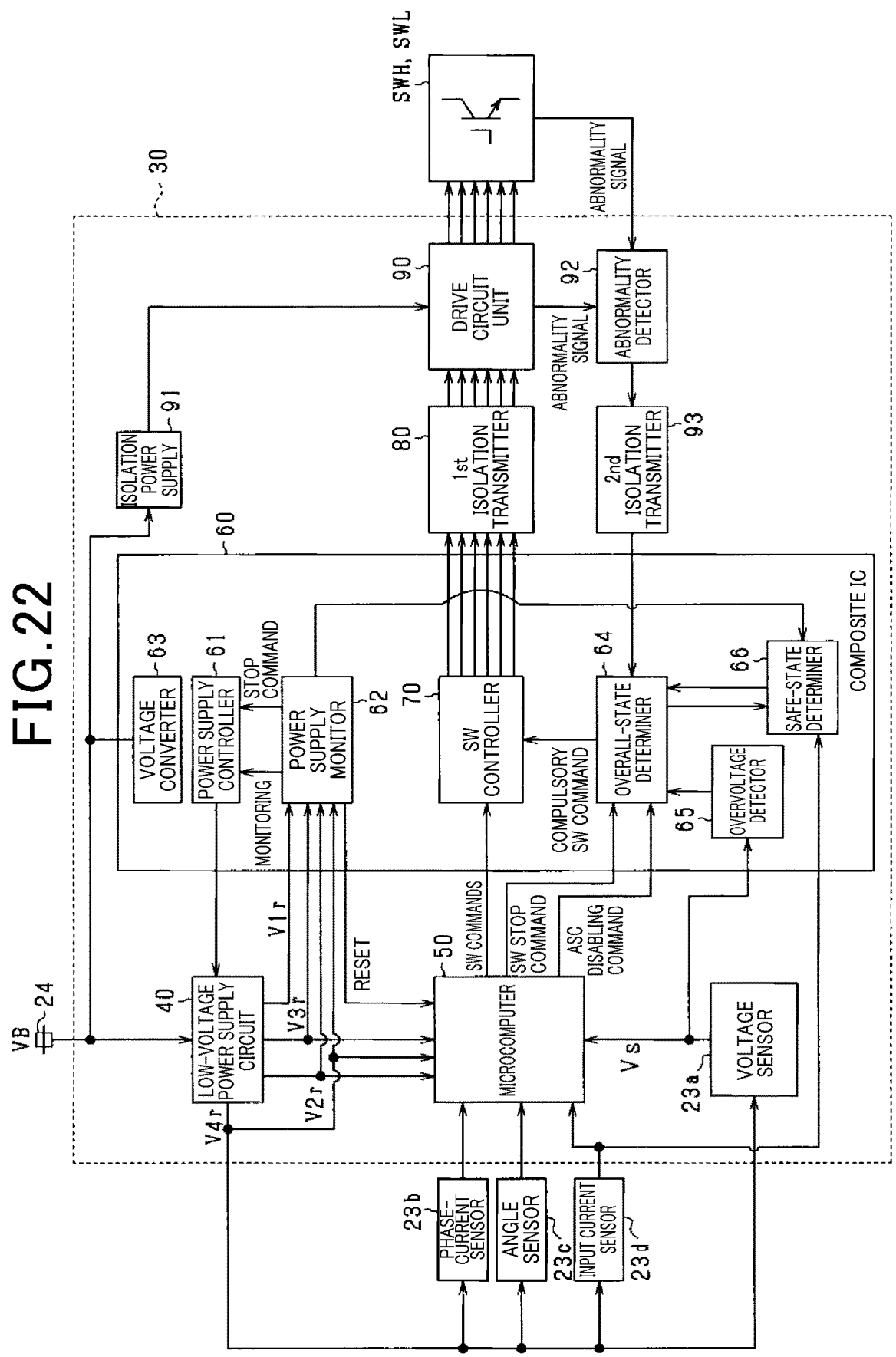
FIG. 22 is a schematic diagram illustrating the configuration of a control circuit according to another modification.

FIG. 22 shows the configuration of a control circuit that is a combination of the control circuit according to the fourth embodiment (see FIG. 14) and the control circuit according to the sixth embodiment (see FIG. 18). In the control circuit shown in FIG. 22, the monitoring results of the power supply monitor 62 are inputted to the safe-state determiner 66; and the output voltages of the low-voltage power supply circuit 40 are divided into two systems.

Figure 23:
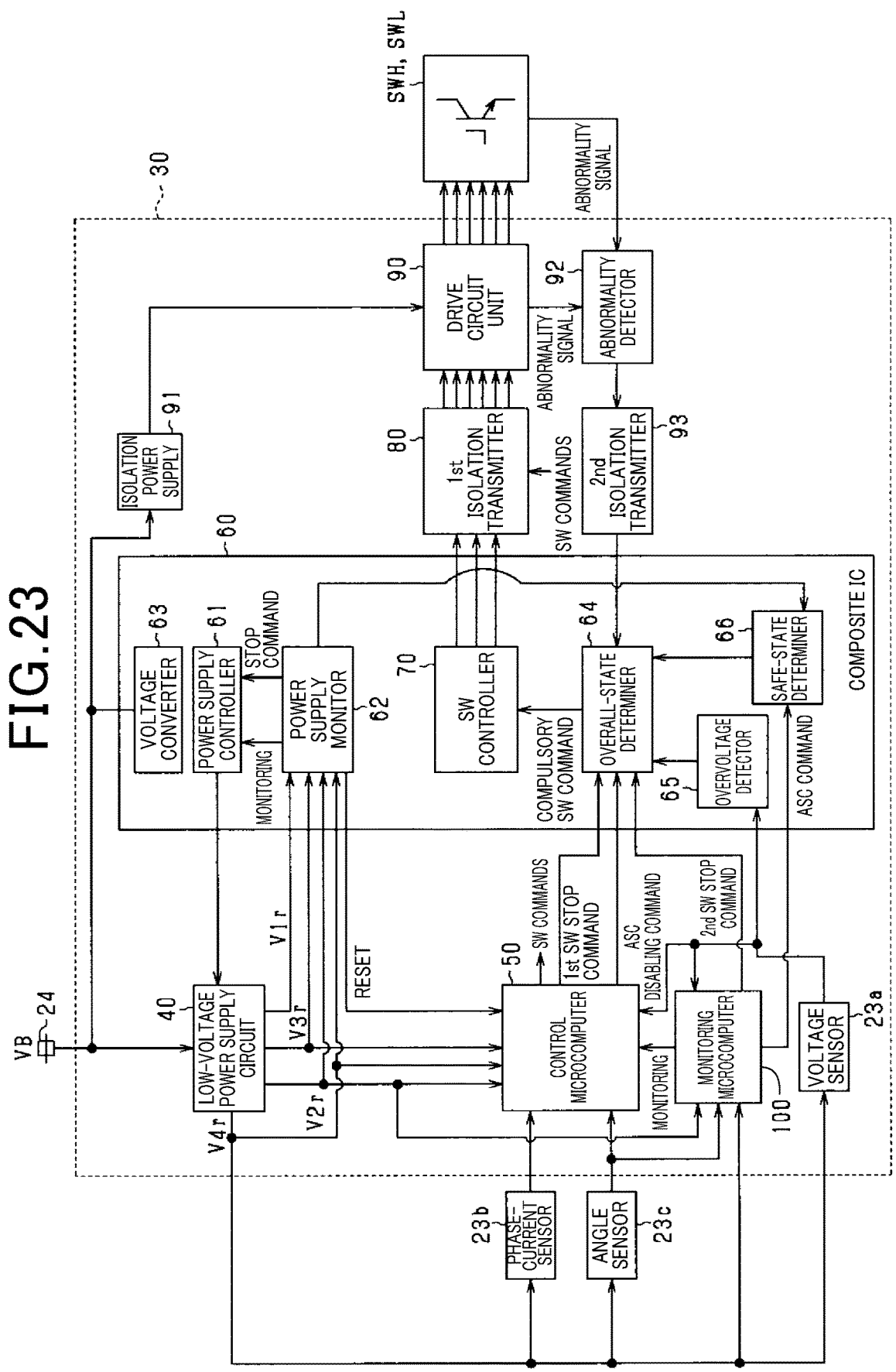
FIG. 23 is a schematic diagram illustrating the configuration of a control circuit according to yet another modification.

FIG. 23 shows the configuration of a control circuit that is a combination of the control circuit according to the fifth embodiment (see FIG. 16) and the control circuit according to the sixth embodiment (see FIG. 18). In the control circuit shown in FIG. 23, the monitoring results of the power supply monitor 62 are inputted to the safe-state determiner 66; and the output voltages of the low-voltage power supply circuit 40 are divided into two systems.

The ASC control may be modified to turn on all of the upper-arm switches SWH of the inverter 20 and turn off all of the lower-arm switches SWL of the inverter 20.

When at least one of the upper-arm switches SWH of the inverter 20 is stuck ON, the ASC control may be performed to turn on all of the upper-arm switches SWH and turn off all of the lower-arm switches SWL of the inverter 20. In contrast, when at least one of the lower-arm switches SWL of the inverter 20 is stuck ON, the ASC control may be performed to turn on all of the lower-arm switches SWL and turn off all of the upper-arm switches SWH of the inverter 20.

When at least one of the upper-arm switches SWH of the inverter 20 is stuck OFF, the ASC control may be performed to turn off all of the upper-arm switches SWH and turn on all of the lower-arm switches SWL of the inverter 20. In contrast, when at least one of the lower-arm switches SWL of the inverter 20 is stuck OFF, the ASC control may be performed to turn off all of the lower-arm switches SWL and turn on all of the upper-arm switches SWH of the inverter 20.

The voltage sensor 23a may alternatively be configured so that the voltage signal Vs outputted from the voltage sensor 23a increases with the terminal voltage of the storage battery 21.

The ASC disabling may not be performed. For example, in step S22 of FIG. 5, the condition (2) regarding the ASC disabling command may be removed.

Each of the upper-arm and lower-arm switches SWH and SWL of the inverter 20 may be configured with, instead of an IGBT, other semiconductor switching elements such as an N-channel MOSFET having a body diode built therein.

Each of the upper-arm and lower-arm switches SWH and SWL of the inverter 20 may be configured with two or more switching elements that are connected in parallel with each other. For example, each of the upper-arm and lower-arm switches SWH and SWL may be configured with a SiC switching element and a Si switching element that are connected in parallel with other, or with an IGBT and a MOSFET that are connected in parallel with other.

The command generator, which generates the switching commands, is not limited to the microcomputer 50. For example, the command generator may be implemented by a control IC or a dedicated IC with a motor control function.

The IC on which the power supply controller 61, the power supply monitor 62, the overall-state determiner 64 and the switch controller 70 are mounted is not limited to the composite IC.

The voltage sensor 23a may alternatively be provided outside the control circuit 30.

The phase-current sensor 23b, the angle sensor 23c and the input current sensor 23d may alternatively be built in the control circuit 30.

Each of the first isolation transmitter 80 and the second isolation transmitter 93 may alternatively be constituted of a magnetic coupler that is a magnetic isolation element. In this case, in performing the ASC control, the composite IC 60 may output to the magnetic couplers a command to stop the output of the switching commands generated by the microcomputer 50. At the same time, the composite IC may output to the drive circuit unit 90 both an ON command for turning on all of the lower-arm switches SWL and an OFF command for turning off all of the upper-arm switches SWH (alternatively, both an ON command for turning on all of the upper-arm switches SWH and an OFF command for turning off all of the lower-arm switches SWL).

The controlled variable of the rotating electric machine is not limited to torque. For example, the controlled variable may alternatively be the rotational speed Nm of the rotor of the rotating electric machine 10.

The rotating electric machine 10 is not limited to an interior permanent magnet synchronous machine. For example, the rotating electric machine 10 may alternatively be configured as a field winding synchronous machine.

Moreover, the rotating electric machine 10 is not limited to a synchronous machine. For example, the rotating electric machine 10 may alternatively be configured as an induction machine.

Furthermore, the rotating electric machine 10 is not limited to an in-vehicle main rotating electric machine. For example, the rotating electric machine 10 may alternatively be an electric motor employed in, for example, an electric power steering system or an air conditioning electric compressor.

The number of phases of the multi-phase rotating electric machine 10 is not limited to three. For example, the number of phases of the rotating electric machine 10 may alternatively be six or nine. In addition, in the case of the number of phases of the rotating electric machine 10 being equal to six, the inverter 20 may include, for example, 12 switches.

The rotating electric machine control system shown in FIG. 1 may further have a boost (or stepping-up) converter provided between the storage battery 21 and the inverter 20.

The low-voltage power supply circuit 40 is not limited to a voltage stepping-down circuit. For example, the low-voltage power supply circuit 40 may alternatively be a voltage boosting (or stepping-up) circuit or a voltage boosting/stepping-down circuit.

The rotating electric machine control system may alternatively include two or more pairs of rotating electric machines and inverters. For example, in the case of the rotating electric machine control system including two pairs of rotating electric machines and inverters, the total number of the switches of the inverters may be equal to 12.

What is claimed is:

1. A control circuit for an electric power converter, the electric power converter including a plurality of switch pairs each consisting of an upper-arm switch and a lower-arm switch that are electrically connected in series with each other, each of the switch pairs having a corresponding one of a plurality of phase windings of a multi-phase rotating electric machine electrically connected to a node between the upper-arm and lower-arm switches of the switch pair, each of the upper-arm and lower-arm switches having a diode electrically connected in antiparallel thereto, the switch pairs having a DC power source electrically connected in parallel thereto, all of the upper-arm switches of the switch pairs together constituting an upper-arm switch group and all of the lower-arm switches of the switch pairs together constituting a lower-arm switch group, the control circuit comprising:
    an abnormality determiner configured to determine whether an abnormality has occurred in at least one of the electric power converter and the rotating electric machine;
    a voltage determiner configured to determine whether a line-to-line voltage between the phase windings of the rotating electric machine when a counterelectromotive force is generated in the phase windings is higher than a voltage of the DC power source; and
    an abnormality-handling controller configured to perform, when both a first condition and a second condition are met, an all-phase short circuit control of turning on all of the switches of one of the upper-arm switch group and the lower-arm switch group and turning off all of the switches of the other of the upper-arm switch group and the lower-arm switch group, thereby inhibiting regeneration from being performed in a system which includes the rotating electric machine, the electric power converter and the DC power source,
    the first condition being that it is determined by the abnormality determiner that an abnormality has occurred in at least one of the electric power converter and the rotating electric machine, and
    the second condition being that it is determined by the voltage determiner that the line-to-line voltage is higher than the voltage of the DC power source.

2. The control circuit as set forth in claim 1, wherein the electric power converter is included in a control system which further includes a voltage sensor, the voltage sensor being configured to detect a voltage applied to each of the switch pairs of the electric power converter and output a voltage signal indicative of the detected voltage,
    the voltage determiner is configured to calculate the voltage applied to each of the switch pairs of the electric power converter based on the voltage signal outputted from the voltage sensor and determine, when the calculated voltage is higher than a predetermined voltage, that the line-to-line voltage is higher than the voltage of the DC power source, and the predetermined voltage is higher than or equal to a minimum value in a range within which the voltage of the DC power source varies during normal operation of the DC power source.

3. The control circuit as set forth in claim 1, wherein the voltage determiner is configured to determine, when an estimated value or a detected value of the line-to-line voltage is higher than a predetermined voltage, that the line-to-line voltage is higher than the voltage of the DC power source.

4. The control circuit as set forth in claim 3, wherein the electric power converter is included in a control system which further includes a voltage sensor, the voltage sensor being configured to detect a voltage applied to each of the switch pairs of the electric power converter and output a voltage signal indicative of the detected voltage, and
the predetermined voltage is set to a voltage that is calculated based on the voltage signal outputted from the voltage sensor.

5. The control circuit as set forth in claim 3, further comprising a line-to-line voltage estimator that is configured to calculate, based on rotational speed of a rotor of the rotating electric machine, an estimated value of the line-to-line voltage,
wherein the voltage determiner is configured to determine, when the estimated value of the line-to-line voltage calculated by the line-to-line voltage estimator is higher than the predetermined voltage, that the line-to-line voltage is higher than the voltage of the DC power source, and
the abnormality-handling controller is configured to perform:
the all-phase short circuit control when it is determined by the abnormality determiner that an abnormality has occurred in at least one of the electric power converter and the rotating electric machine and it is determined by the voltage determiner that the line-to-line voltage is higher than the voltage of the DC power source; and
a shutdown control of turning off all of the upper-arm and lower-arm switches of the switch pairs of the electric power converter when it is determined by the abnormality determiner that an abnormality has occurred in at least one of the electric power converter and the rotating electric machine and it is determined by the voltage determiner that the line-to-line voltage is not higher than the voltage of the DC power source.

6. The control circuit as set forth in claim 1, wherein the electric power converter is included in a control system which further includes a current sensor, the current sensor being configured to detect electric current flowing between the electric power converter and the DC power source and output a current signal indicative of the detected electric current, and
the voltage determiner is configured to:
determine, when all of the upper-arm and lower-arm switches of the switch pairs of the electric power converter are off, whether electric current is flowing from the electric power converter to the DC power source side based on the current signal outputted from the current sensor; and
determine, upon determination that electric current is flowing from the electric power converter to the DC power source side, that the line-to-line voltage is higher than the voltage of the DC power source.

7. The control circuit as set forth in claim 1, wherein the electric power converter is included in a control system which further includes at least one sensor whose output signal is used for the determination by the voltage determiner, and a power supply unit configured to supply electric power to the at least one sensor, and
upon determination of the occurrence of an abnormality related to the output signal of the at least one sensor, the abnormality-handling controller refrains from performing the all-phase short circuit control even when the line-to-line voltage is determined by the voltage determiner to be higher than the voltage of the DC power source.

8. The control circuit as set forth in claim 7, wherein the at least one sensor comprises a voltage sensor which is configured to detect a voltage applied to each of the switch pairs of the electric power converter and whose output signal decreases with increase in the detected voltage, and
when an output voltage of the power supply unit is determined to be lower than a predetermined threshold, the abnormality-handling controller determines that the abnormality related to the output signal of the at least one sensor has occurred.

9. The control circuit as set forth in claim 1, further comprising:
a command generator configured to generate and output switching commands for controlling switching of the upper-arm and lower-arm switches of the switch pairs of the electric power converter; and
a monitor configured to monitor whether an abnormality has occurred in the command generator,
wherein the monitor is further configured to:
determine whether the line-to-line voltage between the phase windings of the rotating electric machine when the counterelectromotive force is generated in the phase windings is higher than the voltage of the DC power source; and
command, when an abnormality has occurred in the command generator and the line-to-line voltage is determined to be higher than the voltage of the DC power source, the abnormality-handling controller to perform the all-phase short circuit control.

10. The control circuit as set forth in claim 1, wherein the electric power converter is included in a control system which further includes a voltage sensor, the voltage sensor being configured to detect a voltage applied to each of the switch pairs of the electric power converter and output a voltage signal indicative of the detected voltage,
the predetermined voltage is set to a voltage that is calculated based on the voltage signal outputted from the voltage sensor,
the control circuit further comprises a line-to-line voltage estimator that is configured to calculate, based on rotational speed of a rotor of the rotating electric machine, an estimated value of the line-to-line voltage,
the voltage determiner is configured to determine, when the estimated value of the line-to-line voltage calculated by the line-to-line voltage estimator is higher than the predetermined voltage, that the line-to-line voltage is higher than the voltage of the DC power source, and
the abnormality-handling controller is configured to perform:
the all-phase short circuit control when it is determined by the abnormality determiner that an abnormality has occurred in at least one of the electric power converter and the rotating electric machine and it is determined by the voltage determiner that the line-to-line voltage is higher than the voltage of the DC power source; and a shutdown control of turning off all of the upper-arm and lower-arm switches of the switch pairs of the electric power converter when it is determined by the abnormality determiner that an abnormality has occurred in at least one of the electric power converter and the rotating electric machine and it is determined by the voltage determiner that the line-to-line voltage is not higher than the voltage of the DC power source.

\* \* \* \* \*